United States Patent
Beckwith et al.

(10) Patent No.: US 9,452,592 B2
(45) Date of Patent: *Sep. 27, 2016

(54) MULTILAYER FILM HAVING AN ACTIVE OXYGEN BARRIER LAYER WITH RADIATION ENHANCED ACTIVE BARRIER PROPERTIES

(75) Inventors: Scott Beckwith, Greer, SC (US); Frank Bryan Edwards, Simpsonville, SC (US); Janet Rivett, Simpsonville, NC (US); Cynthia Louise Ebner, Greer, SC (US); Thomas Kennedy, Simpsonville, SC (US); Rachel McDowell, Moore, SC (US); Drew V. Speer, Simpsonville, NC (US)

(73) Assignee: Cryovac, Inc., Duncan, SC (US)

( * ) Notice: Subject to any disclaimer, the term of this patent is extended or adjusted under 35 U.S.C. 154(b) by 1021 days.

This patent is subject to a terminal disclaimer.

(21) Appl. No.: 11/845,846

(22) Filed: Aug. 28, 2007

(65) Prior Publication Data

US 2009/0061057 A1    Mar. 5, 2009

(51) Int. Cl.
*A23L 3/00* (2006.01)
*B32B 27/00* (2006.01)
(Continued)

(52) U.S. Cl.
CPC .............. *B32B 27/08* (2013.01); *B32B 27/18* (2013.01); *B32B 27/304* (2013.01);
(Continued)

(58) Field of Classification Search
CPC ..... B32B 27/08; B32B 27/34; B32B 27/306; B32B 27/32; B32B 27/18; B32B 27/304; B32B 2307/7244; B32B 2307/736; B32B 2439/70; B32B 2274/00; B32B 2270/00; Y10T 428/31855; Y10T 428/31504
USPC .................. 428/35.7, 36.7, 500; 426/127
See application file for complete search history.

(56) References Cited

U.S. PATENT DOCUMENTS

| 4,192,773 A | 3/1980 | Yoshikawa et al. |
| 4,407,897 A | 10/1983 | Farrell et al. |

(Continued)

FOREIGN PATENT DOCUMENTS

| EP | 0 269 066 B1 | 6/1988 |
| EP | 0 428 736 B1 | 5/1991 |

(Continued)

OTHER PUBLICATIONS

Ciba® SHELFPLUS® O₂-2500 Oxygen Absorber, 2001-2004, pp. 1-2.
(Continued)

*Primary Examiner* — Gwendolyn Blackwell
*Assistant Examiner* — Kevin Ortman, Jr.
(74) *Attorney, Agent, or Firm* — Alston & Bird LLP

(57) ABSTRACT

The present invention is directed to a multilayer film having an active oxygen barrier layer that comprises an oxygen scavenging composition that is a blend of a thermoplastic resin (A) having carbon-carbon double bonds substantially in its main chain, a transition metal salt (B), and an oxygen barrier polymer (C) having oxygen barrier properties that can be further enhanced by exposing the composition to a source of ionizing radiation e.g., electron beam radiation. Irradiation improves the oxygen scavenging abilities of the oxygen scavenging composition so that oxygen can be intercepted and scavenged as it passes through the film. The resulting irradiated multilayer film has improved active barrier properties in comparison to the same film prior to irradiation. As result, the multilayer film of the present invention can be used in packaging applications to help maintain a low oxygen atmosphere in the interior of a package.

31 Claims, 10 Drawing Sheets

(51) Int. Cl.
*H05B 6/00* (2006.01)
*B32B 27/08* (2006.01)
*B32B 27/18* (2006.01)
*B32B 27/30* (2006.01)
*B32B 27/32* (2006.01)
*B32B 27/34* (2006.01)

(52) U.S. Cl.
CPC .......... *B32B 27/306* (2013.01); *B32B 27/32* (2013.01); *B32B 27/34* (2013.01); *B32B 2270/00* (2013.01); *B32B 2274/00* (2013.01); *B32B 2307/7244* (2013.01); *B32B 2307/736* (2013.01); *B32B 2439/70* (2013.01); *Y10T 428/31504* (2015.04); *Y10T 428/31855* (2015.04)

(56) References Cited

U.S. PATENT DOCUMENTS

| | | | |
|---|---|---|---|
| 4,684,573 A * | 8/1987 | Mueller et al. | 428/349 |
| 4,711,741 A | 12/1987 | Fujishima et al. | |
| 4,724,185 A | 2/1988 | Shah | |
| 4,726,984 A | 2/1988 | Shah | |
| 4,735,855 A | 4/1988 | Wofford et al. | |
| 4,741,911 A | 5/1988 | McIntyre et al. | |
| 4,746,562 A | 5/1988 | Fant | |
| 4,755,419 A | 7/1988 | Shah | |
| 4,769,175 A | 9/1988 | Inoue | |
| 4,789,553 A | 12/1988 | McIntyre et al. | |
| 4,839,235 A | 6/1989 | Shah | |
| 4,856,650 A | 8/1989 | Inoue | |
| 4,859,513 A | 8/1989 | Gibbons et al. | |
| 4,925,684 A | 5/1990 | Simon | |
| 4,927,689 A | 5/1990 | Markiewicz | |
| 4,977,004 A | 12/1990 | Bettle, III et al. | |
| 5,004,647 A | 4/1991 | Shah | |
| 5,047,270 A | 9/1991 | Mori et al. | |
| 5,069,946 A | 12/1991 | Moritani et al. | |
| 5,141,801 A | 8/1992 | Takeshita et al. | |
| 5,143,763 A | 9/1992 | Yamada et al. | |
| 5,153,038 A | 10/1992 | Koyama et al. | |
| 5,202,052 A | 4/1993 | Zenner et al. | |
| 5,206,075 A | 4/1993 | Hodgson, Jr. | |
| 5,211,875 A * | 5/1993 | Speer et al. | 252/188.28 |
| 5,213,227 A | 5/1993 | Koyama et al. | |
| 5,241,031 A | 8/1993 | Mehta | |
| 5,256,846 A | 10/1993 | Walters | |
| 5,272,236 A | 12/1993 | Lai et al. | |
| 5,274,024 A | 12/1993 | Koyama et al. | |
| 5,278,272 A | 1/1994 | Lai et al. | |
| 5,281,453 A | 1/1994 | Yamada et al. | |
| 5,364,555 A | 11/1994 | Zenner et al. | |
| 5,387,368 A | 2/1995 | Nishimura et al. | |
| 5,387,449 A | 2/1995 | Kunz et al. | |
| 5,431,939 A | 7/1995 | Cox et al. | |
| 5,518,792 A | 5/1996 | Masuda et al. | |
| 5,723,189 A | 3/1998 | Sudo | |
| 5,744,056 A | 4/1998 | Venkateshwaran et al. | |
| 5,756,171 A | 5/1998 | Moteki et al. | |
| 5,759,653 A | 6/1998 | Collette et al. | |
| 5,773,107 A | 6/1998 | Weinberg | |
| 5,798,055 A | 8/1998 | Blinka et al. | |
| 5,800,887 A | 9/1998 | Koyama | |
| 5,804,236 A | 9/1998 | Frisk | |
| 5,811,027 A | 9/1998 | Speer et al. | |
| 5,820,956 A | 10/1998 | Hatakeyama et al. | |
| 5,849,380 A | 12/1998 | Kashiba et al. | |
| 5,885,481 A | 3/1999 | Venkateshwaran et al. | |
| 5,908,676 A | 6/1999 | Otaki et al. | |
| 5,914,164 A | 6/1999 | Ciocca et al. | |
| 5,916,685 A | 6/1999 | Frisk | |
| 5,928,560 A | 7/1999 | DelDuca et al. | |
| 5,977,212 A | 11/1999 | Ebner et al. | |
| 5,981,676 A | 11/1999 | Gauthier et al. | |
| 5,993,922 A | 11/1999 | Babrowicz et al. | |
| 6,007,885 A | 12/1999 | Hallock | |
| 6,037,022 A | 3/2000 | Adur et al. | |
| 6,071,626 A | 6/2000 | Frisk | |
| 6,095,134 A | 8/2000 | Sievers et al. | |
| 6,117,541 A | 9/2000 | Frisk | |
| 6,123,901 A | 9/2000 | Albert et al. | |
| 6,139,770 A | 10/2000 | Katsumoto et al. | |
| 6,143,197 A | 11/2000 | Gauthier et al. | |
| 6,145,689 A | 11/2000 | Kobayashi et al. | |
| 6,214,254 B1 | 4/2001 | Gauthier et al. | |
| 6,220,311 B1 | 4/2001 | Litto | |
| 6,221,470 B1 | 4/2001 | Ciocca et al. | |
| 6,228,284 B1 | 5/2001 | Ebner et al. | |
| 6,254,802 B1 | 7/2001 | Speer et al. | |
| 6,254,803 B1 | 7/2001 | Matthews et al. | |
| 6,255,248 B1 | 7/2001 | Bansleban et al. | |
| 6,258,883 B1 | 7/2001 | Ebner et al. | |
| 6,265,038 B1 | 7/2001 | Frisk | |
| 6,274,210 B1 | 8/2001 | Ebner et al. | |
| 6,332,552 B1 | 12/2001 | Iwasaki et al. | |
| 6,365,659 B1 | 4/2002 | Aoyama et al. | |
| 6,369,148 B2 | 4/2002 | Chiang et al. | |
| 6,387,461 B1 | 5/2002 | Ebner et al. | |
| 6,388,007 B1 | 5/2002 | Nakatsukasa et al. | |
| 6,391,406 B1 | 5/2002 | Zenner et al. | |
| 6,391,407 B1 | 5/2002 | Kashiba et al. | |
| 6,395,195 B1 | 5/2002 | Evans et al. | |
| 6,423,421 B1 | 7/2002 | Banaszak et al. | |
| 6,508,955 B1 | 1/2003 | DelDuca et al. | |
| 6,579,621 B1 | 6/2003 | Shah | |
| 6,586,514 B2 | 7/2003 | Chiang et al. | |
| 6,599,598 B1 | 7/2003 | Tai et al. | |
| 6,599,639 B2 | 7/2003 | Dayrit et al. | |
| 6,610,234 B2 | 8/2003 | Akkapeddi et al. | |
| 6,610,772 B1 | 8/2003 | Clauberg et al. | |
| 6,616,861 B1 | 9/2003 | Evans et al. | |
| 6,656,383 B1 | 12/2003 | Zenner et al. | |
| 6,666,988 B2 | 12/2003 | DelDuca et al. | |
| 6,682,686 B1 | 1/2004 | Iwasaki et al. | |
| 6,682,791 B2 | 1/2004 | McKnight | |
| 6,706,412 B2 | 3/2004 | Yializis | |
| 6,709,724 B1 | 3/2004 | Teumac et al. | |
| 6,746,772 B2 | 6/2004 | Kashiba et al. | |
| 6,753,370 B2 | 6/2004 | Nakatsukasa et al. | |
| 6,761,965 B2 | 7/2004 | Ferri et al. | |
| 6,821,482 B1 | 11/2004 | Albert et al. | |
| 6,845,599 B2 | 1/2005 | Berlin et al. | |
| 6,861,147 B2 | 3/2005 | Kutsuna et al. | |
| 6,872,451 B2 | 3/2005 | Ebner et al. | |
| 6,875,400 B2 | 4/2005 | Speer et al. | |
| 6,899,822 B2 | 5/2005 | McKedy | |
| 6,908,652 B1 | 6/2005 | Miranda et al. | |
| 6,926,846 B1 | 8/2005 | DelDuca et al. | |
| 6,942,821 B2 | 9/2005 | Dayrit et al. | |
| 6,960,376 B2 | 11/2005 | Tai et al. | |
| 6,984,442 B2 | 1/2006 | Brebion et al. | |
| 7,014,898 B2 | 3/2006 | Ekman et al. | |
| 7,078,100 B2 | 7/2006 | Ebner et al. | |
| 7,153,891 B2 | 12/2006 | Speer | |
| 2002/0102424 A1 | 8/2002 | Yang et al. | |
| 2002/0153511 A1* | 10/2002 | Cotterman et al. | 252/397 |
| 2002/0164244 A1 | 11/2002 | Hunt et al. | |
| 2003/0045641 A1 | 3/2003 | Akkapeddi et al. | |
| 2003/0223657 A1 | 12/2003 | Belias et al. | |
| 2004/0131809 A1 | 7/2004 | McKnight | |
| 2005/0072958 A1 | 4/2005 | Powers | |
| 2005/0153087 A1 | 7/2005 | Tsuji et al. | |
| 2005/0164021 A1* | 7/2005 | Inoue et al. | 428/474.4 |
| 2005/0202968 A1 | 9/2005 | Hekal | |
| 2006/0033078 A1 | 2/2006 | Rollick | |
| 2006/0069197 A1 | 3/2006 | Tammaji et al. | |
| 2006/0076536 A1 | 4/2006 | Barshied | |
| 2006/0192176 A1 | 8/2006 | Rollick et al. | |
| 2006/0208218 A1 | 9/2006 | Al Ghatta | |
| 2006/0281882 A1 | 12/2006 | Tsuji et al. | |

(56) References Cited

U.S. PATENT DOCUMENTS

2007/0020456 A1    1/2007    Solovyov
2008/0241521 A1    10/2008   Solovyov et al.

FOREIGN PATENT DOCUMENTS

| EP | 0 664 824 B1 | 8/1995 |
| EP | 0 830 195 B1 | 3/1998 |
| EP | 0 976 547 | 2/2000 |
| EP | 1 033 080 A2 | 9/2000 |
| EP | 1 050 555 B1 | 11/2000 |
| EP | 1 086 028 B1 | 3/2001 |
| EP | 1 107 672 B1 | 6/2001 |
| EP | 1 184 418 A1 | 3/2002 |
| EP | 1 231 159 A2 | 8/2002 |
| EP | 1 538 176 A1 | 6/2005 |
| EP | 1 640 408 A1 | 3/2006 |
| EP | 1 666 139 A1 | 6/2006 |
| JP | 62 207338 A | 9/1987 |
| JP | 02 299836 A | 12/1990 |
| JP | 2002146217 A | 5/2002 |
| JP | 2002-240813 | 8/2002 |
| JP | 2003 118778 | 4/2003 |
| JP | 2005-001371 | 1/2005 |
| JP | 2005187808 A | 7/2005 |
| JP | 2006063237 A | 3/2006 |
| JP | 2006 282259 | 10/2006 |
| JP | 2006281640 A | 10/2006 |
| WO | WO 90/03414 A1 | 4/1990 |
| WO | WO 93/03093 A1 | 2/1993 |
| WO | WO 97/48753 | 12/1997 |
| WO | WO 99/10251 A1 | 3/1999 |
| WO | WO 02/051915 A2 | 7/2002 |
| WO | WO 02/074537 A1 | 9/2002 |
| WO | WO 2006/089895 A1 | 8/2006 |
| WO | WO 2009/029350 A1 | 3/2009 |
| WO | WO 2009/032418 A2 | 3/2009 |

OTHER PUBLICATIONS

Shelfplus 02-2400, Material Safety Data Sheet, OSHA / ANSI Z400.1-2004 Compliant, Ciba Specialty Chemicals Corporation, MSDS Sep. 9, 2005, pp. 1-9.

Ciba® SHELFPLUS® $O_2$-2400 Oxygen Absorber, 2000-2005, pp. 1-2.

Shelfplus 02-2500, Material Safety Data Sheet, OSHA / ANSI Z400.1-2004 Compliant, Ciba Specialty Chemicals Corporation, MSDS Apr. 12, 2006, pp. 1-9.

Miltz et al., "Evaluation of the Performance of Iron-Based Oxygen Scavengers, with Comments on their Optimal Applications," *Packaging Technology and Science*, vol. 18, pp. 21-27, 2005.

International Search Report and Written Opinion for International Application No. PCT/US2008/073620 dated Feb. 10, 2010.

Office Action from U.S. Appl. No. 11/845,944, mailed Sep. 1, 2010.

Office Action from U.S. Appl. No. 11/845,915, mailed Sep. 1, 2010.

Definition of "wrapped" from <http://dictionary.reference.com/browse/wrapped>, 2010.

Office Action from U.S. Appl. No. 11/845,915, mailed Mar. 27, 2011.

Translation of Office Action from Japanese Application No. 2010-523004, mailed Oct. 11, 2011.

Translation of Office Action from Japanese Appln. No. 2010-523004 mailed Aug. 14, 2012.

* cited by examiner

MULTILAYER FILM HAVING AN ACTIVE OXYGEN BARRIER LAYER WITH RADIATION ENHANCED ACTIVE BARRIER PROPERTIES

FIELD OF THE INVENTION

The present invention relates generally to a multilayer film having an active oxygen barrier layer and more particularly to a multilayer film having an EVOH active oxygen barrier layer.

BACKGROUND OF THE INVENTION

Polymeric films are used in a wide variety of packaging applications, including food packaging, pharmaceutical products and non-perishable consumer goods. Films suitable for each of these applications are typically required to exhibit a range of physical properties. Food packaging films in particular may be required to meet numerous demanding performance criteria, depending on the specific application, such as protection from the environment, resistance to physical and environmental abuse during processing, storage and distribution, and an aesthetic and attractive appearance. Optical properties such as high gloss, high clarity, and low haze contribute to the aesthetic consumer appeal of products wrapped in such packaging materials. Good optical properties also permit adequate inspection of the packaged product during the distribution cycle and by the end-user at point of purchase.

In the case of perishable products, such as oxygen sensitive products, oxygen barrier characteristics are required to provide extended shelf life for the packaged product. Limiting the exposure of oxygen-sensitive products to oxygen maintains and enhances the quality and shelf life of many products. For instance, by limiting the oxygen exposure of oxygen-sensitive food products in a packaging system, the quality of the food product can be maintained and spoilage retarded. In addition, such packaging also keeps the product in inventory longer, thereby reducing costs incurred from waste and having to restock.

In the food packaging industry, several techniques for limiting oxygen exposure have been developed. Common techniques include those where oxygen is consumed within the packaging environment by some means other than the packaged article or the packaging material (e.g., through the use of oxygen scavenging sachets), those where reduced oxygen environments are created in the package (e.g., modified atmosphere packaging (MAP) and vacuum packaging), and those where oxygen is prevented from entering the packaging environment (e.g., barrier films).

Sachets containing oxygen scavenging compositions can contain iron compositions, which oxidize to their ferric state, unsaturated fatty acid salts on an absorbent, ascorbic acid and/or a metal-polyamide complex. The disadvantages of sachets include the need for additional packaging steps (to add the sachet to the package), the potential for contamination of the packaged article should the sachet break, and the danger of ingestion by a consumer.

Oxygen scavenging materials also have been incorporated directly into the packaging structure. This technique (hereinafter referred to as "active oxygen barrier") can provide a uniform scavenging effect throughout the package and can provide a means of intercepting and scavenging oxygen as it passes through the walls of a package, thereby maintaining the lowest possible oxygen level throughout the package. Active oxygen barriers have been formed by incorporating inorganic powders and/or salts as part of the package. However, incorporation of such powders and/or salts can degrade the transparency and mechanical properties (e.g., tear strength) of the packaging material and can complicate processing, especially where thin films are desired. Also, in some cases these compounds as well as their oxidation products can be absorbed by food in the container, which can result in the food product failing to meet governmental standards for human consumption.

In addition, various films have been developed to help provide oxygen barrier properties to the packaging. For example, ethylene vinyl alcohol copolymer (EVOH) has been known as a good oxygen barrier material, and has been used in the past in conjunction with multilayer packaging films. However, many of these films although providing some level of barrier to oxygen may still permit some oxygen to pass through the film and enter the package. As a result, the film may not provide the desired level of oxygen barrier properties. Accordingly, there still exists a need for films having active oxygen barrier properties.

BRIEF SUMMARY OF THE INVENTION

One aspect of the present invention is directed to a multilayer film having an active oxygen barrier layer that comprises a composition that is a blend of a thermoplastic resin (A) having carbon-carbon double bonds substantially in its main chain, a transition metal salt (B), and an oxygen barrier polymer (C). In some embodiments the active oxygen barrier layer may also include a compatibilizer (D). The active oxygen barrier composition has active oxygen barrier properties that can be further enhanced by exposing the composition to a source of ionizing radiation e.g., electron beam radiation or gamma radiation. Irradiation of the composition improves the oxygen scavenging abilities of the composition so that oxygen can be intercepted and scavenged as it passes through the film. The resulting irradiated multilayer film has improved active barrier properties in comparison to the same film prior to irradiation. As a result, the multilayer film of the present invention can be used in packaging applications to help maintain a low oxygen atmosphere in the interior of a package over an extended period of time.

The active oxygen barrier properties (e.g., scavenging abilities) of the active oxygen barrier composition can be enhanced by irradiating the composition so that it receives a dosage of at least about 2 kiloGray (kGy). In a particular embodiment, the multilayer film is irradiated, such as by electron beam or gamma irradiation, at a dosage of between about 10 and 200, and in particular between 15 and 150, such as between about 20 and 150 and between about 20 and 100 kiloGray. In one embodiment, the multilayer film is irradiated with an electron beam dosage that is from about 50 to 100 kiloGray.

The multilayer film may include at least one outer layer adhered to a core layer comprising the active oxygen barrier composition. For example, in one embodiment, the multilayer film may include an outer sealant layer and/or an outer abuse layer. Sealant layer includes an outer surface of the multilayer film that is heat sealable polymeric material. In one embodiment, the sealant layer can be sealed to itself or a second film sheet to form a pouch or bag. The outer abuse layer generally forms an outer protective surface of a package that is formed from the multilayer film. In still other embodiments, depending on the desired characteristics of the film, the multilayer film may include one or more intermediate layers, such as adhesive layers, barrier layers, strengthening layers, and the like. For example, in one embodiment, the multilayer film further includes one or more polyamide layers disposed between the core layer and one or more of the outer layers.

In one particular embodiment, the multilayer film comprises a coextruded active oxygen barrier film having (a) a core layer comprising a blend of ethylene vinyl alcohol copolymer, a thermoplastic resin having carbon-carbon double bonds substantially in its main chain, and a transition metal salt; (b) two intermediate layers each comprising a polyamide; (c) two outer layers; and (d) two layers of adhesive polymeric material disposed between respective intermediate and outer layers, and wherein the film has been irradiated with an electron beam radiation dosage between about 2 and 200 kilo Gray, and has an oxygen scavenging rate that is at least about 0.01 cc oxygen per day per gram of the active oxygen barrier composition.

In some embodiments, the multilayer film may also have shrink attributes. For example, in one embodiment, the multilayer film may have a total free shrink at 185° F. of at least 20 percent, and in particular, a total free shrink at 185° F. of at least 8 percent.

Multilayer films in accordance with the present invention can be used in packaging articles having various forms, such as flexible sheet films, flexible bags, pouches, thermoformed containers, rigid and semi-rigid containers or combinations thereof. Typical flexible films and bags include those used to package various food items and may be made up of one or a multiplicity of layers to form the overall film or bag-like packaging material.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 9:
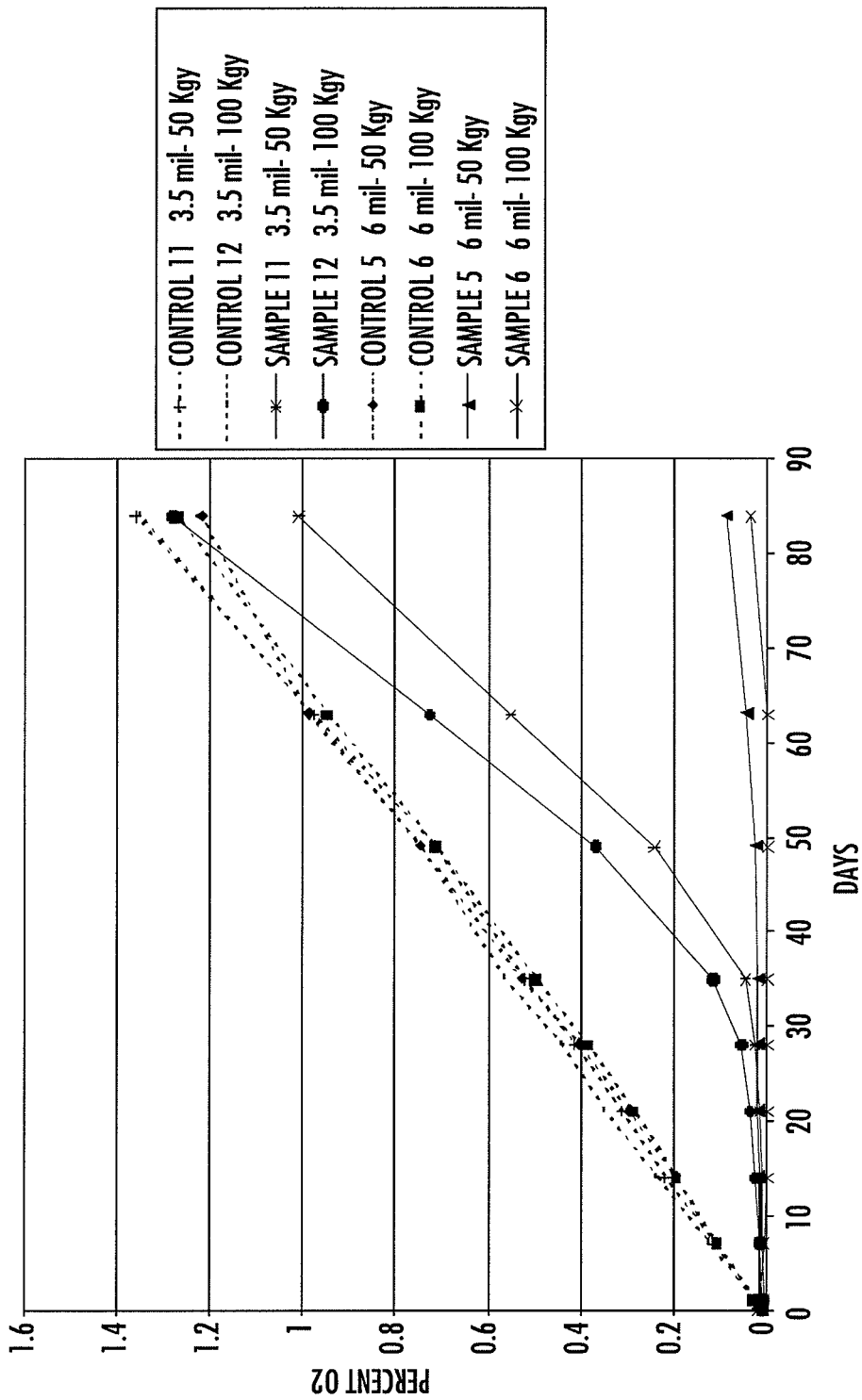
Figure 10:
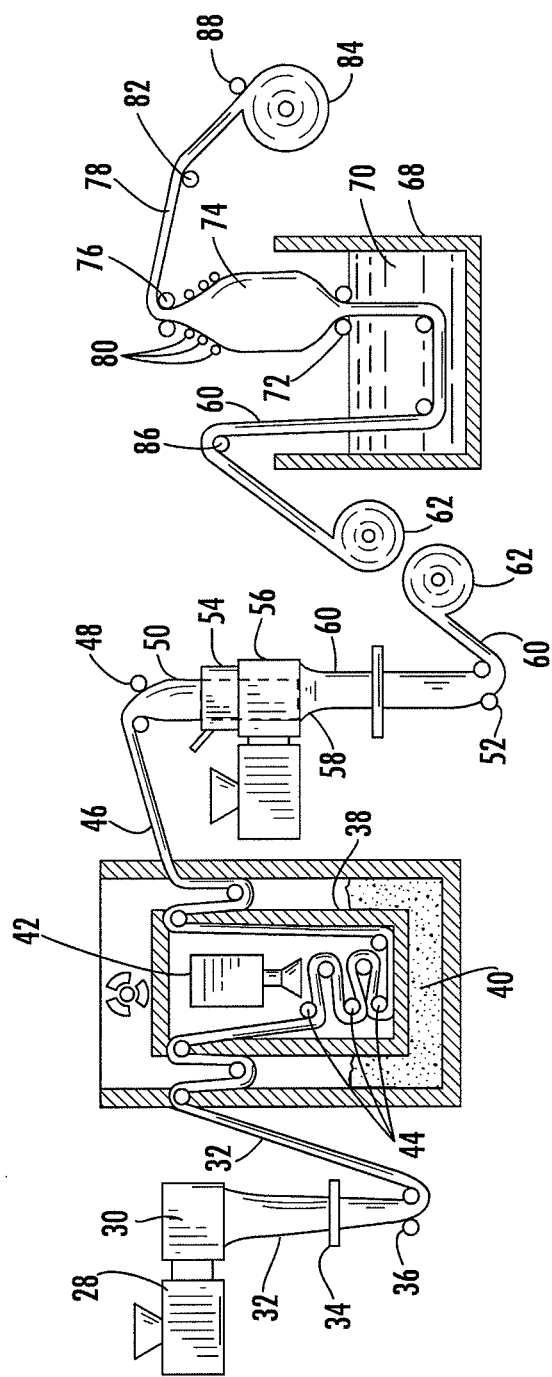

FIG. 9 is a graph that plots percent $O_2$ in the interior of pouches as a function of time to compare the affects of 6 months of storage and oven aging on the active barrier properties of electron beam treated film versus control films; and FIG. 10 is a schematic view of one embodiment of a process for making a multilayer film having heat shrink attributes that is in accordance with one embodiment of the present invention.

DETAILED DESCRIPTION OF THE INVENTION

One or more embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
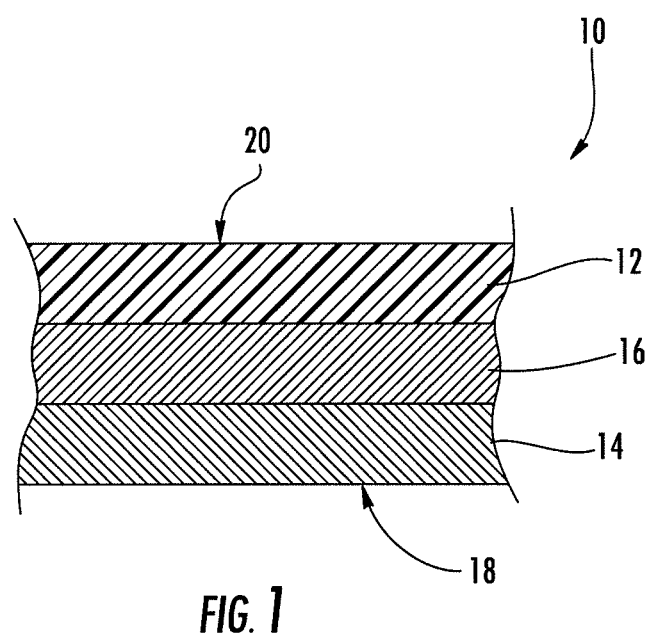
FIG. 1 is a cross-sectional side view of a multilayer film that is in accordance with one aspect of the present invention.

With reference to FIG. 1, a multilayer film having active oxygen barrier properties that is in accordance with one embodiment of the invention is illustrated and broadly designated as reference number 10. In the illustrated embodiment, the multilayer film 10 includes a first outer layer 12, also referred to as a "sealant layer", a second outer layer 14, also referred to as an "outer abuse layer", and an active oxygen barrier layer 16, also referred to as a "core layer", that is disposed between the sealant layer and the abuse layer.

In one embodiment, the core layer 16 may be sandwiched directly between with the sealant layer 12 and the abuse layer 14. In other embodiments, one or more intermediate layers, such as adhesive layers, additional barrier layers, and/or strengthening layers (also referred to as "inner abuse layers"), may be disposed between the core layer 16 and the sealant layer 12 and/or the abuse layer 14. Although, the core layer is depicted as being disposed in the center of the film, it should be recognized that the core layer does not have to be disposed in such a configuration. For example, in some embodiments, the multilayer film may have a non-symmetrical configuration in which the core layer (i.e., the layer containing the active oxygen barrier composition) is located more towards one of the outer surface layers of the multilayer film.

Generally, the overall thickness of the multilayer film may range from between about 0.5 to 30 mils, and in particular between about 2 to 10 mils, such as from about 3 to 6 mils. The thickness of the core layer 16 is typically between about 0.05 and 4 mils thick, and in particular between about 0.2 and 2 mil thick. In one embodiment, the core layer comprises from about 5 to 50% of the overall thickness of the film, and in particular from about 5 to 25% of the overall thickness of the film.

As discussed in greater detail below, the multilayer film of the present invention can be used in a wide variety of packaging applications. For example in the production of bags, pouches, lidstocks, vacuum packaging, vacuum skin packaging, vertical and horizontal form fill packaging, and the like. In some embodiments, surface 18 of the multilayer film may comprise an inner surface of a package made from the multilayer film, and surface 20 may comprise an outer abuse layer for the package. For example, in one embodiment, the sealant layer comprises a polymeric material that is capable of adhering to another component of a package, such as a tray, one or more additional sheets of film, or to itself to form a package having an interior space in which an oxygen sensitive product can be disposed. In one particular embodiment, surface 18 of the multilayer film 10 can be adhered to itself to form a bag or pouch. In one embodiment, the sealant layer comprises a heat sealable polymeric material.

As briefly noted above, the core layer 16 of multilayer film 10 provides an active oxygen barrier comprising a composition that is a blend a thermoplastic resin (A) having carbon-carbon double bonds substantially in its main chain, a transition metal salt (B), and an oxygen barrier polymer (C). In some embodiments the active oxygen barrier composition may also include a compatibilizer (D). The oxygen barrier polymer may comprise about 70 to 99% by weight of the composition, and the thermoplastic resin having carbon-carbon double bonds typically comprises from about 1 to 30weight % of the polymeric portion of the composition. When present, the compatibilizer typically comprises about 0.1 to 29 weight % of the total polymeric portion of the composition. Compositions comprising the active oxygen barrier layer 18 are discussed in greater detail below.

In general, oxygen barrier materials such as EVOH and polyamides absorb moisture from high humidity or water activity environments, which can lead to reduced barrier properties particularly at high temperatures. Moisture barrier layers can be interposed between the oxygen barrier layer and the surface of the film that is exposed to high moisture to diminish the moisture migration rate into the barrier layer. Additionally, layers that are highly permeable to moisture can be inserted between the oxygen barrier layer and the surface of the film with the lower water activity or relative humidity in order to wick moisture away from the barrier layer. By reducing the moisture uptake into the moisture sensitive oxygen barrier layer and by wicking moisture away from the moisture sensitive oxygen barrier layer, the water activity or relative humidity within the barrier layer will be kept lower and the oxygen barrier properties will be maximized.

The active oxygen barrier layer includes an oxygen scavenging moiety that intercepts and binds with oxygen passing through the multilayer film to thereby maintain a low oxygen atmosphere in the interior of a package comprising the multilayer film. Over a period of time however, the capacity of the scavenging moiety to intercept and bind with oxygen may become diminished so that the overall active barrier properties of the layer are diminished. In some cases, the reduction in capacity can result in the active oxygen barrier layer having a significant reduction in oxygen barrier properties, which may result in the film having poor oxygen barrier properties. As discussed in greater detail below, it has been discovered that irradiating the film, and hence the active oxygen barrier composition can improve the oxygen scavenging abilities of the composition and can also improve the capacity of the oxygen scavenging composition so that the film is capable of scavenging oxygen over a greater length of time in comparison to a similar film that has not been irradiated.

In one embodiment, the multilayer film of the present invention has an oxygen permeability of 50 cc·20 μm/(m$^2$·day·atm) or less at 65% RH and 20° C. Unless indicated to the contrary all oxygen permeability rates are measured according to ASTM D-3985. For example, in one particular embodiment, the multilayer film has an oxygen permeability of 5 cc·20 μm/(m$^2$·day·atm) or less at 65% RH and 20 C., and more particularly less than 0.5 cc·20 μm/(m$^2$·day·atm) or less at 65% RH and 20° C. The multilayer film can also be characterized in terms of its oxygen absorption rate. In one embodiment, the multilayer film has an oxygen absorption rate that is at least about 0.01 ml/(g·day), and in particular an oxygen absorption rate that is at least about 0.1 ml/(g·day), and more particularly at least about 0.1 ml/(g·day).

In one embodiment, the at least one active oxygen barrier layer 16 comprises a composition that is a blend of a thermoplastic resin (A) having carbon-carbon double bonds substantially in its main chain, a transition metal salt (B), and an oxygen barrier polymer (C). In some embodiments, the blend may also include a compatibilizer (D). The oxygen barrier polymer will typically comprise 70 to 99% by weight of the composition, and the thermoplastic resin having carbon-carbon double bonds with typically comprise from about 1 to 30 weight % of the polymeric portion of the composition. When a compatibilizer is used, it generally comprises from about 0.1 to 29 weight % of the total polymeric portion of the composition. Suitable active oxygen barrier compositions are described in greater detail in U.S. Patent Publication Nos. 2006/0281882 and 2005/0153087, the contents of which are hereby incorporated by reference in their entirety to the extent they are consistent with the teachings herein.

In one embodiment, the thermoplastic resin (A) comprises at least one of the units represented by formula (I) and formula (II):

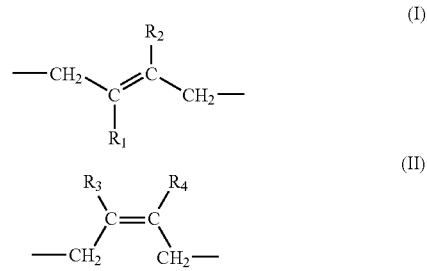

wherein $R_1$, $R_2$, $R_3$ and $R_4$ are the same or different, a hydrogen atom, an alkyl group that may be substituted, an aryl group that may be substituted, an alkylaryl group that may be substituted, —COOR$_5$, —OCOR$_6$, a cyano group or a halogen atom, and $R_3$ and $R_4$ may together form a ring via a methylene group or an oxymethylene group, where $R_5$ and $R_6$ are an alkyl group that may be substituted, an aryl group that may be substituted or an alkylaryl group that may be substituted. In one embodiment, $R_1$, $R_2$, $R_3$ and $R_4$ are hydrogen atoms in the formula (I) and formula (II). In some embodiments, the adjacent carbon-carbon double bonds in the thermoplastic resin (A) are separated by at least three methylenes.

In one embodiment, the thermoplastic resin (A) has a unit represented by a formula (III):

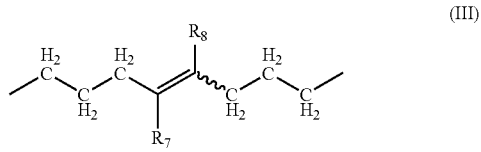

wherein $R_7$ and $R_8$ are each independently a hydrogen atom, an alkyl group that may be substituted, an aryl group that may be substituted, an alkylaryl group that may be substituted, —$COOR_9$, —$OCOR_{10}$, a cyano group or a halogen atom, and $R_9$ and $R_{10}$ are each independently a hydrogen atom, or an alkyl group having 1 to 10 carbon atoms.

In one embodiment, the thermoplastic resin (A) comprises at least one resin selected from the group consisting of polybutadiene, polyisoprene, polychloroprene, polyoctenamer and polyoctenylene, and combinations thereof. In one particular embodiment, the thermoplastic resin (A) is at least one resin selected from the group consisting of polybutadiene and polyoctenylene, and combinations thereof, such as polyoctenylene.

The transition metal salt (B) may include at least one metal salt selected from the group consisting of an iron salt, a nickel salt, a copper salt, a manganese salt and a cobalt salt, and combinations thereof. Counter ions for the transition metal salt may include caproate, 2-ethylhexanoate, neodecanoate, oleate, palmitate and stearate, and combinations thereof. Typically, the amount of transition metal salt (B) that is contained in the composition is present in a ratio of about 1 to 50,000 ppm in terms of the metal element with respect to the weight of the thermoplastic resin (A). In one embodiment, the transition metal salt (B) is contained in a ratio of about 5 to 10,000 ppm, and in particular in a ratio of about 10 to 5,000 ppm.

Generally, the oxygen absorption amount of the thermoplastic resin (A) is at least about 1.6 mols per 1 mol of carbon-carbon double bonds of the thermoplastic resin (A). In one embodiment, the oxygen absorption rate of the active oxygen barrier layers is at least about 0.01 ml/(g·day).

In one embodiment, particles of the thermoplastic resin (A) are dispersed in a matrix of the oxygen barrier polymer (C) in the composition. As discussed above, the oxygen barrier polymer (C) generally has an oxygen transmission rate of 500 ml·20 μm/(m²·day·atm) or less in 65% RH at 20° C. In one embodiment, the oxygen barrier polymer may be selected from the group consisting of polyvinyl alcohol, ethylene vinyl alcohol copolymer, polyamide, polyvinyl chloride and its copolymers, polyvinylidene dichloride and its copolymers, and polyacrylonitrile and its copolymers, polyethylene naphthenate and its copolymers, polyethylene terephthalate and its copolymers, and combinations thereof.

The oxygen barrier polymer generally has an oxygen permeability of 500 cc·20 μm(m²·day·atm.) or less at 65% RH and 20° C. In one embodiment, the oxygen barrier polymer (C) is selected from the group consisting of polyvinyl alcohol, ethylene vinyl alcohol copolymer, polyamide, polyvinyl chloride and its copolymers, polyvinylidene dichloride and its copolymers, and polyacrylonitrile and its copolymers, and combinations thereof.

In one particular embodiment, the oxygen barrier polymer (C) is ethylene vinyl alcohol copolymer having an ethylene content from 5 to 60 mol % and a degree of saponification of 90% or more. More preferably, the ethylene vinyl alcohol copolymer has an ethylene content between 27 and 60 percent, and in particular from about 30 to 44 mole percent, for example, 32 mole percent. The amount of EVOH copolymer in the core layer is typically between about 70 and 99 weight percent, based on the total weight of the core layer. In one embodiment, the amount of EVOH copolymer is from about 85 to 95 weight percent, and in particular about 90 weight percent, based on the total weight of the core layer.

Generally, the oxygen barrier polymer (C) is present in an amount of 70 to 99 weight % and the thermoplastic resin (A) is contained in an amount of 1 to 30 weight %, when the total weight of the thermoplastic resin (A) and the oxygen barrier polymer (C) is determined to be 100 weight %.

In some embodiments, the composition comprising the active oxygen barrier layer may further include a compatibilizer (D). An example of a suitable compatibilizer (D) having a polar group is disclosed in detail, for example, in Japanese Laid-Open Patent Publication No. 2002-146217. Among the compatibilizers disclosed in the publication, a styrene-hydrogenated diene block copolymer having a boronic ester group is particularly useful. The above-described compatibilizer (D) can be used alone or in combination of two or more.

In one particular embodiment, the oxygen barrier polymer (C) is contained in an amount of 70 to 98.9 weight %, the thermoplastic resin (A) is contained in an amount of 1 to 29.9 weight %, and the compatibilizer (D) is contained in an amount of 0.1 to 29 weight %, when the total weight of the thermoplastic resin (A), the oxygen barrier polymer (C) and the compatibilizer (D) is determined to be 100 weight %.

As the compatibilizer (D), ethylene-vinyl alcohol copolymers can also be used. In particular, when the oxygen barrier polymer (C) is EVOH, its effect as the compatibilizer is exhibited sufficiently. Among these, an ethylene-vinyl alcohol copolymer having an ethylene content of 70 to 99 mol % and a degree of saponification of 40% or more is preferable to improve the compatibility. The ethylene content is more preferably 72 to 96 mol %, even more preferably 72 to 94 mol %. When the ethylene content is less than 70 mol %, the affinity with the thermoplastic resin (A) may be deteriorated. When the ethylene content is more than 99 mol %, the affinity with the EVOH may be deteriorated. Furthermore, the degree of saponification is preferably 45% or more. There is no limitation regarding the upper limit of the degree of saponification, and an ethylene-vinyl alcohol copolymer having a degree of saponification of substantially 100% can be used. When the degree of saponification is less than 40%, the affinity with the EVOH may be deteriorated.

When the oxygen absorption resin composition of the present invention contains the oxygen barrier polymer (C) and the compatibilizer (D) as resin components, in addition to the thermoplastic resin (A), it is preferable that the thermoplastic resin (A) is contained in a ratio of 1 to 29.9 weight %, the oxygen barrier polymer (C) is contained in a ratio of 70 to 98.9 weight %, and the compatibilizer (D) is contained in a ratio of 0.1 to 29 weight %, when the total weight of the thermoplastic resin (A), the oxygen barrier polymer (C) and the compatibilizer (D) is 100 weight %. If the content of the oxygen barrier polymer (C) is less than 70 weight %, the gas barrier properties of the resin composition with respect to oxygen gas or carbon dioxide gas may deteriorate. On the other hand, if the content of the oxygen barrier polymer (C) is more than 98.9 weight %, the content of the thermoplastic resin (A) and the compatibilizer (D) is small, so that the oxygen scavenging function may deteriorate, and the stability of the morphology of the entire resin composition may be impaired. In one embodiment, the content of the thermoplastic resin (A) is more than about 2 to 19.5 weight %, and in particular from about 3 to 14 weight %. The content of the oxygen barrier polymer (C) is generally from about 80 to 97.5 weight %, and in particular from about 85 to 96 weight %. The content of the compatibilizer (D) is typically about 18 to 0.5 weight %, and in particular from about 1 to 12 weight %.

In some embodiments, the active oxygen barrier layer can contain an antioxidant. Suitable antioxidants may include 2,5-di-tert-butylhydroquinone, 2,6-di-tert-butyl-p-cresol, 4,4,'-thiobis(6-tert-butylphenol), 2,2'-methylene-bis(4-methyl-6-tert-butylphenol), octadecyl-3-(3',5'-di-tert-butyl-4'-hydroxyphenyl)propionate, 4,4'-thiobis(6-tert-butylphenol), 2-tert-butyl-6-(3-tert-butyl-2-hydroxy-5-methylbenzyl)-4-methylphenylacrylate, pentaerythritoltetrakis(3-laurylthiopropionate), 2,6-di-(tert-butyl)-4-methylphenol (BHT), 2,2-methylenebis(6-tert-butyl-p-cresol), triphenyl phosphite, tris(nonylphenyl) phosphite, dilauryl thiodipropionate, or the like.

The amount of the antioxidant to be present in the active oxygen barrier composition is readily determined through experimentation as appropriate, in view of the kinds and the contents of components of the resin composition, and the use and the storage conditions of the resin composition, and the like. In general, the amount of the antioxidant is typically from about 0.01 to 1% by weight, and in particular from about 0.02 to 0.5% by weight, based on the total weight of the active oxygen barrier composition. If the amount of the antioxidant is too small, the reaction with oxygen may proceed extensively during storage or melt-kneading of the active oxygen barrier composition, so that the oxygen scavenging function may be lowered before the resin composition of the present invention is actually put to use. If the amount of the antioxidant is large, the reaction of the active oxygen barrier composition with oxygen can be inhibited, so that the oxygen scavenging function of the resin composition of the present invention will not be immediately active upon manufacture. In such cases, it may be desirable to further incorporate a photoinitiator into the composition and activate the composition at a later point in time with actinic radiation. Suitable photoinitiators and methods of triggering using actinic radiation are disclosed in U.S. Pat. Nos. 5,211,875; 6,139,770; 6,254,802; and 7,153,891, which are hereby incorporated by reference in their entirety.

Other polymeric compositions that may be used in the active oxygen barrier layer may include barrier polymers having an unsaturated organic moiety blended therein, such as nylons including both amorphous and semi-crystalline nylons.

The active oxygen barrier layer may have a thickness ranging from about 0.05 to about 4.0 mils; from about 0.1 to about 2 mils; from about 0.5 to about 1.5 mils, and from about 0.7 to about 1.3 mils. Further, the thickness of the active oxygen barrier layer(s) as a percentage of the total thickness of the multilayer film may range (in ascending order of preference) from about 1 to about 25 percent, from about 5 to about 20 percent, and from about 10 to about 15 percent. The active oxygen barrier layer(s) may have a thickness relative to the thickness of the multilayer film of at least about any of the following values: 1%, 2%, 3%, 4%, 5%, 8%, 10%, 15%, 20%, 25%, and 35%.

The core layer may also include one or more additional ingredients such as a compatibilizer, antioxidants, heat stabilizers, and the like.

As noted above, the active oxygen barrier composition comprises an unsaturated ethylenically unsaturated polymer that is capable of binding with oxygen molecules passing through the film. The active oxygen barrier composition of the present invention may react with oxygen immediately upon fabrication of the composition or shortly thereafter. As such, it will be protected from excessive exposure to oxygen until the multilayered film of the invention is produced. The multilayered film of the invention will also be protected from excessive exposure to oxygen until it is used. Generally, irradiating a film, such as exposing the film to an electron beam, is used to induce crosslinking between unsaturated moieties in the polymer chains. In the present case, it was believed that exposing the active multilayer film to ionizing radiation would result in crosslinking of the active oxygen barrier composition, which would result in destroying or lessening its oxygen scavenging abilities. However, it was unexpectedly discovered that exposing the active multilayer film of the present invention to electron beam radiation resulted in improving the oxygen scavenging abilities of the active oxygen barrier composition, resulting in further improvements in the oxygen barrier properties of the film.

In one embodiment, irradiating the multilayer film with electron beam radiation results in the multilayer film having oxygen barrier performance that is greater than the multilayer film prior to irradiation. For example, in one embodiment, the multilayer film exhibits at least a 5% decrease in oxygen ingress through the film after 35 days in comparison to the same film that has not been irradiated. In some embodiments, the film exhibits a decrease in oxygen ingress through the film after 35 days that is more than 10, 15, and 20% in comparison to the same film that has not been irradiated, and may exhibit at least a 25% 50%, 75%, 85% or 100% decrease in oxygen ingress through the film after 70 days in comparison to the same film that has not been irradiated.

In one embodiment, the oxygen scavenging abilities of the layer, film, etc., containing the active oxygen barrier composition is enhanced by exposing it to an ionizing radiation dosage of at least about 2 kiloGray (kGy). In particular, the multilayer film is irradiated, such as by electron beam or gamma irradiation, at a dosage of between about 10 and 200, and in particular between 15 and 150, more particularly between 20 and 150, and more particularly between 20 and 100 kiloGray. In one embodiment, the multilayer film is irradiated with an electron dosage that is from about 50 to 100 kiloGray. Other potential sources of radiation include ionizing radiation such as gamma and X-ray. Duration of exposure depends on several factors including, but not limited to, the amount of the active oxygen barrier composition that is present in the core layer, thickness of the layers to be exposed, thickness and opacity of intervening layers, amount of any antioxidant present, and intensity of the radiation source.

When using oxygen scavenging layers or articles, irradiation can occur during or after the layer or article is prepared. If the resulting layer or article is to be used to package an oxygen sensitive product, exposure can be just prior to, during, or after packaging. When irradiation occurs after packaging, the ionizing radiation dose can be used to sterilize the contents of the package and enhance the activity of the barrier composition. A suitable method for sterilizing an article and initiating oxygen scavenging is disclosed in U.S. Pat. No. 6,875,400, the contents of which are hereby incorporated by reference. For best uniformity of radiation, exposure generally occurs at a processing stage where the layer or article is in the form of a flat sheet or tube.

When the method of the present invention is to be used in an active oxygen barrier application, the radiation enhanced oxygen scavenging activity, in combination with any oxygen barriers, can create an overall oxygen transmission of less than about $1.1 \times 10^{-10}$ $cm^3/m^2 \cdot s \cdot Pa$ (1.0 $cm^3/m^2 \cdot day \cdot atm$) at 25° C. The oxygen scavenging capacity typically is such that this value is not exceeded for at least two days.

After exposure of the active oxygen barrier composition to radiation, the scavenging composition, layer, or article prepared therefrom is generally able to scavenge up to its capacity, i.e., the amount of oxygen which the scavenger is capable of consuming before it becomes ineffective. In actual use, the capacity required for a given application can depend on the quantity of oxygen initially present in the package, the rate of oxygen entry into the package in the absence of the scavenging property, and the intended shelf life for the package. When using scavengers that include the composition of the present invention, the capacity can be as low as 1 $cm^3/g$, but can be 60 $cm^3/g$ or higher. When such scavengers are in a layer of a film, the layer may have an oxygen capacity of at least about 0.98 $cm^3/m^2$ per µm thickness (250 $cm^3/m^2$ per mil), and in particular at least about 59 $cm^3/m^2$ per µm thickness (1500 $cm^3/m^2$ per mil).

Figure 2:
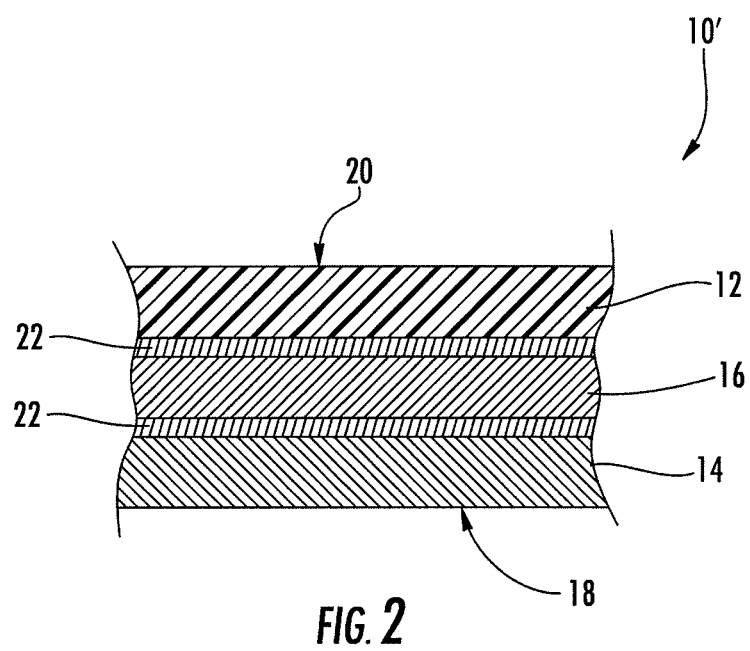
FIG. 2 is a cross-sectional side view of a second embodiment of the multilayer film that is in accordance with one aspect of the present invention.

The multilayer film may also include one or more additional layers such as moisture barrier layer(s), oxygen barrier layer(s), inner abuse or strengthening layer(s), and adhesive or tie layer(s), although the multilayer film may have a composition such that tie layers are not incorporated in the film. FIG. 2 illustrates an alternative embodiment of the multilayer film that further includes two adhesive layers 22 that are each disposed between the outer layers and the core layer 16. The adhesive layers, if present, may comprise ionomers, EVA; EMA; EAO's, including heterogeneous and homogeneous; polyethylene homopolymer; and chemically modified versions of the aforementioned materials, for example, compositions grafted with maleic anhydride. The number, orientation, and type of layers in the multilayer film may be varied to provide a film having desired properties, for example, strength, modulus, abuse resistance, optical properties, barrier properties, and the like.

In addition to the active oxygen barrier layer, the multilayer film may also include one or more intermediate oxygen barrier layers that are disposed between the core layer 16 and one or more of the outer sealant or abuse layers. For example, in one embodiment the multilayer film can further include a barrier type material having a permeance to oxygen of no more than about $5.8 \times 10^{-8}$ $cm^3/m^2 \cdot s \cdot Pa$ (i.e., about 500 $cm^3/m^2 \cdot 24$ hours·atm), such as no more than $1.06 \times 10^{-8}$ $cm^3/m^2 \cdot s \cdot Pa$ (i.e., 100 $cm^3/m^2 \cdot 24$ hours·atm), such as no more than $0.58 \times 10^{-8}$ $cm^3/m^2 \cdot s \cdot Pa$ (i.e., 50 $cm^3/m^2 \cdot 24$ hours·atm) at 25° C.

Polymers which are commonly used in such oxygen barrier layers include poly(ethylene/vinyl alcohol)(EVOH), poly(vinyl alcohol) (PVOH), polyacrylonitrile (PAN), polyesters such as polyethylene terephthalate (PET), and polyethylene naphthalate (PEN), and their copolyesters, polyvinyl chloride (PVC and its copolymers), polyvinylidene chloride (PVDC and its copolymers), and polyamides such as polycaprolactam (nylon 6), metaxylylene adipamide (MXD6), MXD6/MXDI and copolyamides based on m-xylylenediamine, hexamethylene adipamide (nylon 66), amorphous polyamides such as nylon 6T,6T, as well as various amide copolymers and various blends of the above. Additional oxygen barriers include metal foil layers, metal coatings, depositions of metal, metal oxides such as silica ($SiO_x$), alumina, nano clays and vermiculite can also provide oxygen barrier properties.

In addition to providing oxygen barrier properties, the resin comprising the one or more intermediate layers can be selected to improve the mechanical properties of the multilayer film, such as abuse resistance, modulus, tensile strength, and the like. For example, in one embodiment, the core layer 16 may be adhered on both surfaces to intermediate layers comprising a polyamide or copolyamide, such as nylon 6, nylon 9, nylon 11, nylon 12, nylon 66, nylon 69, nylon 610, nylon 612, nylon 6/12, nylon 6/66, nylon 6/69, nylon 66/610, nylon 66/6, nylon 6T, and nylon 12T, amorphous nylons such as MXD6 (a copolymer of m-xylylenediamine and adipic acid), nylon 6I/6T (e.g., a copolyamide of an aliphatic hexamethylene diamide, and an aromatic isophthalic acid and terephthalic acid), etc.; and blends of any of the above, in any suitable proportions of each blend component. Commercial resins available for each type include: for nylon 6,12: CR 9™, CA 6E™, and CF 6S™ (Emser), 7024 B™, 7028 B™, and 7128 B™ (Ube), and VESTAMID™ D 12™, D 14™, and D 16™ (Huels); for nylon 12: VESTAMID™ L 1600, L 1700, and L 1801 (Huels), BESNO™ (Atochem), GRILAMID™ TR 55 (Emser), and Ube 3024 B™ (Ube); for nylon 11: BESNO™ (Atochem); for nylon 6,66: ULTRAMID™ C 35 (BASF), and XTRAFORM™ 1539 and 1590 (Allied); for nylon 6,69: GRILON™ CF 62 BSE and XE 3222™ (Emser); and for nylon 6,10: ULTRAMID™ S3 and S4 (BASF). An exemplary amorphous nylon is GRIVORY™ G21, which is available from Emser Industries. When present, the total thickness of the polyamide layers may vary widely. For example, each layer can form between about 5% and 25% of the total thickness of the multilayer film.

As discussed above, the sealant layer may define an inner (i.e., food side) surface 18 of the multilayer film. The sealant layer may comprise a polymeric material (e.g., component or blend of components) that facilitates the heat-sealing of multilayer film 10 to another object, such as a support member or tray, film, or to itself, for example, to form a pouch. The sealant layer generally comprises a polymeric resin or combination of polymeric resins that is heat-sealable to a support member, one or more additional sheets of film, or to itself.

The inner (sealant) and outer (abuse) layers may include one or more thermoplastic polymers including polyolefins, polystyrenes, polyurethanes, polyvinyl chlorides, and ionomers provided that the desired permeability of the sealant layer may be maintained. In one embodiment, the sealant and abuse layers comprise a thermoplastic plastomer, such as a plastomer comprising ethylene/alpha-olefin copolymer and having a density of greater than about 0.895 g/cc. In the context of the invention, the term "plastomer" refers to a homogeneous ethylene/alpha-olefin copolymer having a density in the range of from about 0.89 to about 0.93 g/cc, such as from 0.90 to 0.905.

Useful polyolefins include ethylene homo- and co-polymers and propylene homo- and co-polymers. Ethylene homopolymers may include low density polyethylene ("LDPE") and hyperbranched ethylene polymers that are synthesized with chain walking type catalyst, such as Brookhart catalyst. Ethylene copolymers include ethylene/alpha-olefin copolymers ("EAOs"), ethylene/unsaturated ester copolymers, and ethylene/unsaturated acid copolymers. ("Copolymer" as used in this application means a polymer derived from two or more types of monomers, and includes terpolymers, etc.).

EAOs are copolymers of ethylene and one or more alpha-olefins, the copolymer having ethylene as the majority mole-percentage content. In some embodiments, the comonomer includes one or more $C_3$-$C_{20}$ alpha-olefins, such as one or more $C_4$-$C_{12}$ alpha-olefins, or one or more $C_4$-$C_8$ alpha-olefins. Particularly useful alpha-olefins include 1-butene, 1-hexene, 1-octene, and mixtures thereof.

EAOs include one or more of the following: 1) medium density polyethylene ("MDPE"), for example having a density of from 0.93 to 0.94 $g/cm^3$; 2) linear medium density polyethylene ("LMDPE"), for example having a density of from 0.926 to 0.94 $g/cm^3$; 3) linear low density polyethylene ("LLDPE"), for example having a density of from 0.915 to 0.935 $g/cm^3$; 4) very-low or ultra-low density polyethylene ("VLDPE" and "ULDPE"), for example having density below 0.915 g/cm³; and 5) homogeneous EAOs. Useful EAOs include those having a density of less than about any of the following: 0.925, 0.922, 0.92, 0.917, 0.915, 0.912, 0.91, 0.907, 0.905, 0.903, 0.9, and 0.86 grams/cubic centimeter. Unless otherwise indicated, all densities herein are measured according to ASTM D1505.

The polyethylene polymers may be either heterogeneous or homogeneous. As is known in the art, heterogeneous polymers have a relatively wide variation in molecular weight and composition distribution. Heterogeneous polymers may be prepared with, for example, conventional Ziegler Natta catalysts.

On the other hand, homogeneous polymers are typically prepared using metallocene or other single site-type catalysts. Such single-site catalysts typically have only one type of catalytic site, which is believed to be the basis for the homogeneity of the polymers resulting from the polymerization. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions. Examples of homogeneous polymers include the metallocene-catalyzed linear homogeneous ethylene/alpha-olefin copolymer resins available from the Exxon Chemical Company (Baytown, Tex.) under the EXACT trademark, linear homogeneous ethylene/alpha-olefin copolymer resins available from the Mitsui Petrochemical Corporation under the TAFMER trademark, and long-chain branched, metallocene-catalyzed homogeneous ethylene/alpha-olefin copolymer resins available from the Dow Chemical Company under the AFFINITY trademark.

More particularly, homogeneous ethylene/alpha-olefin copolymers may be characterized by one or more properties known to those of skill in the art, such as molecular weight distribution ($M_w/M_n$), composition distribution breadth index (CDBI), narrow melting point range, and single melt point behavior. The molecular weight distribution ($M_w/M_n$), also known as "polydispersity," may be determined by gel permeation chromatography. Homogeneous ethylene/alpha-olefin copolymers which can be used in the present invention generally have an $M_w/M_n$ of less than 2.7; such as from about 1.9 to 2.5; or from about 1.9 to 2.3 (in contrast heterogeneous ethylene/alpha-olefin copolymers generally have a $M_w/M_n$ of at least 3). The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear ethylene homopolymer is defined to be 100%. The Composition Distribution Breadth Index (CDBI) is determined via the technique of Temperature Rising Elution Fractionation (TREF). CDBI determination may be used to distinguish homogeneous copolymers (i.e., narrow composition distribution as assessed by CDBI values generally above 70%) from VLDPEs available commercially which generally have a broad composition distribution as assessed by CDBI values generally less than 55%. TREF data and calculations therefrom for determination of CDBI of a copolymer may be calculated from data obtained from techniques known in the art, such as, for example, temperature rising elution fractionation as described, for example, in Wild et. al., J. Poly. Sci. Poly. Phys. Ed., Vol. 20, p. 441 (1982). In some embodiments, homogeneous ethylene/alpha-olefin copolymers have a CDBI greater than about 70%, i.e., a CDBI of from about 70% to 99%. In general, homogeneous ethylene/alpha-olefin copolymers useful in the present invention also exhibit a relatively narrow melting point range, in comparison with "heterogeneous copolymers", i.e., polymers having a CDBI of less than 55%. In some embodiments, the homogeneous ethylene/alpha-olefin copolymers exhibit an essentially singular melting point characteristic, with a peak melting point ($T_m$), as determined by Differential Scanning Calorimetry (DSC), of from about 60° C. to 105° C. In one embodiment, the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer SYSTEM 7™ Thermal Analysis System. Melting information reported are second melting data, i.e., the sample is heated at a programmed rate of 10° C./min. to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. For example, the alpha-olefin is a $C_3$-$C_{20}$ alpha-monoolefin, such as a $C_4$-$C_{12}$ or a $C_4$-$C_8$ alpha-monoolefin. For example, the alpha-olefin comprises at least one member selected from the group consisting of butene-1, hexene-1, and octene-1, i.e., 1-butene, 1-hexene, and 1-octene, respectively, or a blend of hexene-1 and butene-1.

Processes for preparing and using homogeneous polymers are disclosed in U.S. Pat. No. 5,206,075, to HODGSON, Jr., U.S. Pat. No. 5,241,031, to MEHTA, and PCT International Application WO 93/03093, each of which is hereby incorporated herein by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated herein by reference thereto, in their respective entireties.

Still another species of homogeneous ethylene/alpha-olefin copolymers is disclosed in U.S. Pat. No. 5,272,236, to LAI, et al., and U.S. Pat. No. 5,278,272, to LAI, et al., both of which are hereby incorporated herein by reference thereto, in their respective entireties.

Another useful ethylene copolymer is ethylene/unsaturated ester copolymer, which is the copolymer of ethylene and one or more unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth)acrylate"), where the esters have from 4 to 12 carbon atoms.

Representative examples of the first ("vinyl ester") group of monomers include vinyl acetate, vinyl propionate, vinyl hexanoate, and vinyl 2-ethylhexanoate. The vinyl ester monomer may have from 4 to 8 carbon atoms, from 4 to 6 carbon atoms, from 4 to 5 carbon atoms, and 4 carbon atoms.

Representative examples of the second ("alkyl (meth) acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and from 4 to 5 carbon atoms.

The unsaturated ester (i.e., vinyl ester or alkyl (meth) acrylate) comonomer content of the ethylene/unsaturated ester copolymer may range from about 3 to about 18 weight %, and from about 8 to about 12 weight %, based on the weight of the copolymer. Useful ethylene contents of the ethylene/unsaturated ester copolymer include the following amounts: at least about 82 weight %, at least about 85 weight %, at least about 88 weight %, no greater than about 97 weight %, no greater than about 93 weight %, and no greater than about 92 weight %, based on the weight of the copolymer.

Representative examples of ethylene/unsaturated ester copolymers include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, and ethylene/vinyl acetate.

Another useful ethylene copolymer is ethylene/unsaturated carboxylic acid copolymer, such as a copolymer of ethylene and acrylic acid or ethylene and methacrylic acid, or both. Also useful are ethylene copolymers comprising unsaturated alkyl esters and unsaturated carboxylic acids.

Useful propylene copolymer includes propylene/ethylene copolymers ("EPC"), which are copolymers of propylene and ethylene having a majority weight % content of propylene, such as those having an ethylene comonomer content of less than 10%, such as less than 6%, or from about 2% to 6% by weight.

Ionomer is a copolymer of ethylene and an ethylenically unsaturated monocarboxylic acid having the carboxylic acid groups partially neutralized by a metal ion, such as sodium or zinc, preferably zinc. Useful ionomers include those in which sufficient metal ion is present to neutralize from about 15% to about 60% of the acid groups in the ionomer. The carboxylic acid is e.g. "(meth)acrylic acid"—which means acrylic acid and/or methacrylic acid. Useful ionomers include those having at least 50 weight % and preferably at least 80 weight % ethylene units. Useful ionomers also include those having from 1 to 20 weight percent acid units. Useful ionomers are available, for example, from Dupont Corporation (Wilmington, Del.) under the SURLYN trademark.

The sealant and abuse layers may have a composition such that any one or combinations of the above described polymers comprise at least about any of the following weight percent values: 1, 2, 5, 10, 20, 30, 40, 45, 50, 55, 60, 65, 70, 75, 80, 85, 90, 95, and 100% by weight of the respective layer. In some embodiments, the composition of the sealant and abuse layers may be selected to provide a symmetrical film. In other embodiments, the compositions of the sealant and abuse layers may be selected to provide a non-symmetrical film. As noted above, the abuse layer and sealant layers may comprise the same composition or may have a composition that is different from each other. For example, in some embodiments, the sealant layer may comprise a polyethylene while that abuse layer may comprise a nylon or polypropylene, and vice versa.

The thickness of the sealant layer is selected to provide sufficient material to effect a strong heat seal bond, yet not so thick so as to negatively affect the manufacture (i.e., extrusion) of the film, e.g., by lowering the melt strength of the film to an unacceptable level. The thickness of the sealant layer as a percentage of the total thickness of the multilayer film may range (in ascending order of preference) from about 1 to about 25 percent, from about 5 to about 20 percent, and from about 10 to about 15 percent. The sealant layer may have a thickness relative to the thickness of the multilayer film of at least about any of the following values: 1%, 2%, 3%, 4%, 5%, 8%, 10%, 15%, 20%, 25%, and 35%.

Similarly, the thickness of the outer abuse layer is selected to provide sufficient material to provide an outer abuse layer having sufficient strength to withstand rupture, tearing, and the like, yet not so thick so as to negatively affect the manufacture (i.e., extrusion) of the film. The thickness of the abuse layer as a percentage of the total thickness of the multilayer film may range (in ascending order of preference) from about 1 to about 25 percent, from about 5 to about 20 percent, and from about 10 to about 15 percent. The abuse layer may have a thickness relative to the thickness of the multilayer film of at least about any of the following values: 1%, 2%, 3%, 4%, 5%, 8%, 10%, 15%, 20%, 25%, and 35%.

In some embodiments, the multilayer film 10 may also have a heat-shrinkable attribute. Generally, many conventional shrink films comprise chlorinated polymers, such as polyvinyl chloride (PVC) or poly(vinylidene dichloride) (PVDC). Such polymers although having useful heat-shrink attributes may degrade upon being exposed to electron beam irradiation. As a result, many conventional processes produce heat shrinkable barrier films in a two step process in which the chlorine containing film layer is attached to a second layer after the second layer has been irradiated. In the present invention, it believed that irradiation improves the scavenging of the active oxygen barrier composition as well as the heat shrinkability of the film. As a consequence, the present invention provides a method whereby a multilayer film having both heat shrink attributes and active oxygen barrier properties is provided while eliminating the need for irradiating a layer of film having the oxygen scavenging moiety in a separate step.

In one embodiment, the multilayer film 10 may have a free shrink measured at 185° F. in at least one direction (i.e., machine or transverse direction), in at least each of two directions (machine and transverse directions), or a total free shrink of at least about any of the following values: 5%, 7%, 10%, 15%, 20%, 30%, 40%, 50%, and 60%.

As is known in the art, the total free shrink is determined by summing the percent free shrink in the machine (longitudinal) direction with the percentage of free shrink in the transverse direction. For example, a film which exhibits 50% free shrink in the transverse direction and 40% free shrink in the machine direction has a total free shrink of 90%.

Unless otherwise indicated, each reference to free shrink in this application means a free shrink determined by measuring the percent dimensional change in a 10 cm×10 cm specimen when subjected to selected heat (i.e., at a certain temperature exposure) according to ASTM D 2732. Also, a reference herein to the shrink attributes of a film that is a component of a laminate refers to the shrink attributes of the film itself, which can be measured by separating the film from the laminate—for example, by using an appropriate solvent to dissolve the adhesive that bonds the films together to form the laminate. If a heat-shrinkable film is desired, the thus obtained tube or sheet is heated to the orientation temperature, generally comprised between about 110° C. and about 125° C., by passing it through a hot air tunnel or an IR oven and stretched mono- or bi-axially. When a round extrusion die is employed, stretching is generally carried out by the trapped bubble technique. In this technique the inner pressure of a gas such as air is used to expand the diameter of the thick tubing obtained from the extrusion to give a larger bubble transversely stretched, and the differential speed of the nip rolls that hold the bubble is used to get the longitudinal stretching. Generally stretching is in a ratio of at least 3:1 in each direction. Alternatively, when a flat die is used in the extrusion, if a heat-shrinkable film is desired, orientation is carried out by means of a tenter frame. Longitudinal stretching is generally obtained by passing the film on at least two couples of conveying rolls wherein the second set rotates at a speed higher than that of the first set. The transverse orientation is on the other hand obtained by blocking the film side edges by means of a series of clips that travel onto two continuous chains that gradually diverge with the advancing of the film. Alternatively to said sequential stretching, either longitudinal first and then transversal or transversal first and then longitudinal, stretching may also be simultaneous in both directions. In case of stretching by tenter-frame the stretching ratios are generally higher than with the trapped bubble method.

Multilayer films in accordance with the invention may have low haze characteristics. Haze is a measurement of the transmitted light scattered more than 2.50 from the axis of the incident light. Haze is measured according to the method of ASTM D 1003, which is incorporated herein in its entirety by reference. All references to "haze" values in this application are by this standard. In some embodiments, the haze of either multilayer film 10 is no more than about 20%, 15%, 10%, 9%, 8%, 7%, 6%, 5%, 4%, and 3%.

Multilayer film 10 may have a gloss, as measured against the outer surface 24 of the film of at least about 40%, 50%, 60%, 63%, 65%, 70%, 75%, 80%, 85%, 90%, and 95%. These percentages represent the ratio of light reflected from the sample to the original amount of light striking the sample at the designated angle. All references to "gloss" values in this application are in accordance with ASTM D 2457 (45° angle).

In some embodiments, the multilayer film 10 is transparent (at least in any non-printed regions) so that a packaged food item therein is visible through the film. "Transparent" as used herein means that the material transmits incident light with negligible scattering and little absorption, enabling objects (e.g., packaged food or print) to be seen clearly through the material under typical unaided viewing conditions (i.e., the expected use conditions of the material). In some embodiments, the transparency (i.e., clarity) of any of the multilayer film 10 is at least about any of the following values: 65%, 70%, 75%, 80%, 85%, 90% and 95%, as measured in accordance with ASTM D1746.

In some embodiments, the multilayer film 10 exhibits a Young's modulus sufficient to withstand the expected handling and use conditions. Young's modulus may be measured in accordance with one or more of the following ASTM procedures: D882; D5026; D4065, each of which is incorporated herein in its entirety by reference. In one embodiment, the multilayer film 10 may have a Young's modulus of at least about 30,000 psi with a modulus of 45,000 to 200,000 psi or greater. A higher modulus film has an enhanced stiffness, which may help reduce the tendency of the film to stretch when subjected to various processing conditions, such as elevated temperatures, cutting, and the like. As a result, the film may have less of a tendency to distort or become damaged during various packaging procedures, such as those that may be encountered in VFFS or HFFS packaging. Further, it may be helpful in some embodiments that the film 10 has a high modulus at the elevated temperatures that may be present when the film 10 is exposed to heat seal temperatures, for example, during the lidstock sealing or package sealing processes.

The multilayer film of the present invention may be prepared by a process which involves the co-extrusion of a thick tubular shape laminate film (called "tape") which is quenched just under the die, folded by a pair of nip rolls and then heated to a temperature typically comprised between about 80 and about 120° C., preferably at least 105° C., and in particular of at least 110° C., and expanded, still at this temperature, by internal air pressure to get the transversal orientation and by a differential speed of the pinch rolls which hold the bubble to provide the longitudinal orientation so as to get a cylindrically-shaped laminate thin film. After being so stretched the film is rapidly cooled to somehow freeze-in the resulting film a latent shrinkability ("trapped bubble" technique).

Alternatively the films according to the present invention can also be prepared by extrusion coating wherein the multilayer tube to be oriented is formed by extruding or co-extruding a first tape (called the primary tape) and then coating said tape with the other layers which are either sequentially extruded or in a single step coextruded thereon.

Still alternatively the film according to the present invention may be prepared by flat co-extrusion or extrusion coating followed, after a quenching step, by the orientation of the extruded film by tenterframe at a temperature generally comprised between about 105° C. and about 120° C.

The active barrier composition can also be used to prepare a film with shrink properties. The multilayer film prepared in the example was prepared via standard processes. "Solid-state orientation" herein refers to an orientation process carried out at a temperature higher than the highest $T_g$ (glass transition temperature) of resins making up the majority of the structure and lower than the highest melting point, of at least some of the film resins, i.e. at a temperature at which at least some of the resins making up the structure are not in the molten state. Solid state orientation may be contrasted to "melt state orientation" i.e. including hot blown films, in which stretching takes place immediately upon emergence of the molten polymer film from the extrusion die.

"Solid state oriented" herein refers to films obtained by either coextrusion or extrusion coating of the resins of the different layers to obtain a primary thick sheet or tube (primary tape) that is quickly cooled to a solid state to stop or slow crystallization of the polymers, thereby providing a solid primary film sheet, and then reheating the solid primary film sheet to the so-called orientation temperature, and thereafter biaxially stretching the reheated film sheet at the orientation temperature using either a tubular solid-state orientation process (for example a trapped bubble method) or using a simultaneous or sequential tenter frame process, and finally rapidly cooling the stretched film to provide a heat shrinkable film. In the trapped bubble solid state orientation process the primary tape is stretched in the transverse direction (TD) by inflation with air pressure to produce a bubble, as well as in the longitudinal direction (LD) by the differential speed between the two sets of nip rolls that contain the bubble. In the tenter frame process the sheet or primary tape is stretched in the longitudinal direction by accelerating the sheet forward, while simultaneously or sequentially stretching in the transverse direction by guiding the heat softened sheet through a diverging geometry frame.

"Heat shrinkable" herein refers to a property of a material which, when heated to a temperature of 185° F., will exhibit a free shrink (ASTM D 2732) of at least 8%, and in particular at least 10%, 15%, or 20% in the longitudinal direction, and/or at least 8%, and in particular at least 10%, 15%, or 20% in the transverse direction. Heat shrinkable films of this invention are solid state oriented as contrasted to hot blown films which are melt state oriented.

"LD" herein refers to the longitudinal direction, i.e. the direction of the film parallel to the path of extrusion. "TD" herein refers to the transverse direction, i.e. the direction of the film transverse to the path of extrusion.

With reference to FIG. 10, a process of illustration an exemplary method of preparing a heat shrinkable film is illustrated. In one embodiment, solid polymer beads (not illustrated) are fed to a plurality of extruders 28 (for simplicity, only one extruder is illustrated). Inside extruders 28, the polymer beads are forwarded, melted, and degassed, following which the resulting bubble-free melt is forwarded into die head 30, and extruded through an annular die, resulting in tubing 32 which is in one embodiment from about 10 mils to 40 mils thick, e.g. about 20 to 30 mils thick.

After cooling or quenching by water spray from cooling ring 34, tubing 32 is collapsed by pinch rolls 36, and is thereafter fed through irradiation vault 38 surrounded by shielding 40, where tubing 32 is irradiated with high energy electrons (i.e., ionizing radiation) from iron core transformer accelerator 42. Tubing 32 is guided through irradiation vault 38 on rolls 44. Tubing 32 is in one embodiment irradiated to a level of from 30 to 80 kiloGrays, e.g. 40 to 70, or 50 to 60 kiloGrays.

After irradiation, irradiated tubing 46 is directed through pinch rolls 48, following which irradiated tubing 46 is slightly inflated, resulting in trapped bubble 50. However, at trapped bubble 50, the tubing is not significantly drawn longitudinally, as the surface speed of nip rolls 52 are about the same speed as nip rolls 48. Generally, irradiated tubing 46 is inflated to an extent that is sufficient to provide a substantially circular tubing without significant transverse orientation, i.e., without stretching.

In some embodiments, the slightly inflated, irradiated tubing 50 is passed through vacuum chamber 54, and thereafter forwarded through a coating die 56. Second tubular film 58 is melt extruded from coating die 56 and coated onto slightly inflated, irradiated tube 50, to form a tubular film 60. Further details of the above-described coating step are generally as set forth in U.S. Pat. No. 4,278,738, to Brax et. al., which is hereby incorporated by reference in its entirety. However, in the present invention this second coating step can be omitted because irradiation of the active oxygen barrier composition results in enhancing the oxygen barrier performance of the film.

After irradiation and any coating, film 60 is wound up onto windup roll 62. Thereafter, windup roll 62 is removed and installed as unwind roll 62, on a second stage in the process of making the tubing film as ultimately desired. Film 60, from unwind roll 62, is unwound and passed over guide roll 86, after which the film 60 passes into hot water bath tank 68 containing hot water 70. The now collapsed, irradiated, film 60 is submersed in hot water 70 (having a temperature of about 185° F.) for a retention time of at least about 30 seconds, i.e., for a time period in order to bring the film up to the desired temperature for biaxial orientation. Thereafter, irradiated tubular film 60 is directed through nip rolls 72, and bubble 74 is blown, thereby transversely stretching tubular film 60. Furthermore, while being blown, i.e., transversely stretched, nip rolls 76 draw tubular film 60 in the longitudinal direction, as nip rolls 76 have a surface speed higher than the surface speed of nip rolls 72. As a result of the transverse stretching and longitudinal drawing, irradiated, coated biaxially solid state oriented blown tubing film 78 is produced, this blown tubing having been both transversely stretched in a ratio of from about 1:1.5 to 1:6, and drawn longitudinally in a ratio of from about 1:1.5 to 1:6. For example, the stretching and drawing are each performed a ratio of from about 1:2 to 1:4. The result is a biaxial orientation of from about 1:2.25 to 1:36, such as 1:4 to 1:16. While bubble 74 is maintained between pinch rolls 72 and 76, blown tubing 78 is collapsed by rolls 80, and thereafter conveyed through pinch rolls 76 and across guide roll 82, and then rolled onto wind-up roll 84. Idler roll 88 assures a good wind-up.

In an alternative embodiment, the process described in FIG. 10 can be modified by making a fully coextruded film, such as a fully coextruded tubular film, that does not require an extrusion coating step. Thus, the irradiated tubing 46 can thus be collected onto wind-up roll 62, without the intervening extrusion coating step shown in FIG. 10. The wound-up tubing can be immediately, or at some point thereafter, be advanced to the solid-state orientation process shown in the right side of FIG. 10, i.e. from reference numeral 62 forward.

Multilayer films in accordance with the present invention can be used in packaging articles having various forms. Suitable articles include, but are not limited to, flexible sheet films, flexible bags, rigid containers or combinations thereof. Typical flexible films and bags include those used to package various food items and may be made up of one or a multiplicity of layers to form the overall film or bag-like packaging material.

Material in the form of flexible films and bags may have thickness ranging from about 5 to 260 micrometers. Typical rigid or semi-rigid articles include plastic, paper or cardboard containers, such as those utilized for juices, soft drinks, as well as thermoformed trays or cups normally have wall thickness in the range of from 100 to 1,000 micrometers. The multilayer film of the present invention can be used as an integral layer or as a coating of the formed packaging article.

Besides packaging articles applicable for food and beverage, packaging for articles for other oxygen-sensitive products can also benefit from the present invention. Such products may include pharmaceuticals, oxygen sensitive medical products, corrodible metals or products, electronic devices and the like.

The following examples are provided for illustrating one or more embodiments of the present invention and should not be construed as limiting the invention.

EXAMPLES

Multilayer films used in the following examples were prepared via cast coextrusion. Each of the films in the examples has an eight-layer structure. Films having a total thickness of about 3.5 mils, 6 mils and 10 mils were prepared. Unless otherwise indicated all percentages are weight percentages. The materials used in the examples are identified below.

LLDPE-1: EXCEED™ 4518PA; an ethylene hexene-1 copolymer, produced by single site catalysis, with a melt index of 4.5 g/10 min (ASTM D-1238) and a density of 0.918 g/cc (ASTM D-1505); purchased from Exxon Mobil of Houston, Tex.

LLDPE-2: AMPACET™ 10853: a linear low density polyethylene based masterbatch containing 19.4% diatomaceous earth with a melt index of 1.5 g/min (ASTM 1238) and a density of 1.00 g/cc (ASTM 1505); obtained from Ampacet of De Ridder, La.

LDPE-1: LD102.74™ is a low density polyethylene containing slip, antioxidants and antiblock additives with a density of 0.920 g/cc and a melting point of 110° C., obtained from Exxon Mobil of Houston, Tex.

LDPE-2: ESCORENE™ LD200.48 is a low density polyethylene with a melt index of 7.5 g/10 min (Melt index per ExxonMobil Method) and a density of 0.917 g/cc (Density per ExxonMobil Method); obtained from Exxon Mobil of Houston, Tex.

LDPE-3: FSU 255E™ is a low density polyethylene based masterbatch containing 25.0% diatomaceous earth silica and 5.0% erucamide with a melt index of 8.0 g/10 min (ASTM D-1238) and a density of 1.08 g/cc (ASTM D-792); obtained from A. Schulman of Cleveland, Ohio.

MA-LLDPE-3: PX 3236™ is an anhydride-grafted linear low density polyethylene having a melt index of 2.0 g/10 min (ASTM D-1238) and a density of 0.921 g/cc (ASTM D-792); purchased from Equistar Chemicals of Chicago, Ill.

Nylon 6-1: CAPRON™ B100WP is a polyamide 6 resin having a melt flow index of 2.6 g/10 min (ASTM D-1238 (235/1.0)), a density of 1.135 g/cc (ASTM D-792) and a melting point of 220.degree. C.; purchased from Honeywell of Hopewell, Va.

Nylon 6I/6T-2: GRIVORY™ G21 is an amorphous polyamide 6I/6T resin with a glass transition temperature ($T_g$) of 125° C. (ASTM D-3418) and a density of 1.18 g/cc (ASTM D-792); obtained from EMS of Sumter, S.C.

Nylon 6-3: ULTRADID™ B33LN01 is a polyamide-6 resin having a density of 1.14 g/cc and a melting point of 220° C. purchased from BASF.

Nylon 6-4: CLARIANT™ 1080864S is a polyamide-6 masterbatch containing 20% diatomaceous earth and 10% erucamide with a density of 1.20 g/cc (ASTM D-792) and a melting point of 220° C.; purchased from Clariant of Minneapolis, Minn.;

Nylon 6-5: GRILON™ XE 3361; a polyamide-6 masterbatch containing 5% talcum (magnesium silicate), 5% calcium carbonate, and 5% n,n'-ethylene bis stearamide with a density of 1.140 g/cc (ASTM D-792) and a melting point of 220° C.; purchased from EMS of Sumter, S.C.

EVOH-1: EVAL™ F171B is an ethylene-vinyl alcohol copolymer commercially available from Kuraray containing 32% by mole of ethylene.

EVOH-2: XEP-1070™ is the active barrier composition, which contains approximately 90% of an ethylene-vinyl alcohol copolymer containing 32 mol % of ethylene (EVAL F171B) and 10% of the scavenging components "A, B and D" described above, available from Kuraray, Japan.

MA-EVA-1: BYNEL™ CXA 39E660 available from Dupont is a maleic anhydride grafted ethylene copolymer in ethylene/vinyl acetate copolymer (EVA) with 12% vinyl acetate monomer, and a melt index of 2.5, used as an adhesive or tie layer.

VLDPE-1: EXACT™ 3024: a homogeneous ethylene/butene-1 copolymer, produced by single site metallocene catalysis, with a melt index of 4.5 g/10 min (ASTM D-1238), a melting point ($T_m$) of 98° C. (DSC per ExxonMobil Method) and a density of 0.905 g/cc (Density per ExxonMobil Method); purchased from Exxon Mobil of Houston, Tex.

The following 8-layered films were prepared using the above-identified resins. The correspondingly numbered comparative and inventive films are the same with the exception that the EVOH core layer of the inventive films is EVOH-2, the Kuraray XEP-1070 active barrier resin composition.

Comparative Film 1

| Layer | Gauge (mils) | Component |
|---|---|---|
| 1 | 0.9 | 70% LLDPE-1/30% LDPE-1 |
| 2 | 1.02 | MA-LLDPE-3 |
| 3 | 0.72 | 80% Nylon 6-1/20% Nylon 6I/6T-2 |
| 4 | 0.60 | EVOH-1 |
| 5 | 0.66 | 80% Nylon 6-1/20% Nylon 6I/6T-2 |
| 6 | 0.42 | MA-LLDPE-3 |
| 7 | 0.84 | 70% LLDPE-1/30% LDPE-2 |
| 8 | 0.84 | 70% LLDPE-1/30% LDPE-2 |

Inventive Film 1

| Layer | Gauge (mils) | Component |
|---|---|---|
| 1 | 0.9 | 70% LLDPE-1/30% LDPE-1 |
| 2 | 1.02 | MA-LLDPE-3 |
| 3 | 0.72 | 80% Nylon 6-1/20% Nylon 6I/6T-2 |
| 4 | 0.60 | EVOH-2 |
| 5 | 0.66 | 80% Nylon 6-1/20% Nylon 6I/6T-2 |
| 6 | 0.42 | MA-LLDPE-3 |
| 7 | 0.84 | 70% LLDPE-1/30% LDPE-2 |
| 8 | 0.84 | 70% LLDPE-1/30% LDPE-2 |

Comparative Film 2

| Layer | Gauge (mils) | Component |
|---|---|---|
| 1 | 0.46 | 96% Nylon 6-3/2% Nylon 6-4/2% Nylon 6-5 |
| 2 | 0.81 | MA-EVA-1 |
| 3 | 0.23 | 80% Nylon 6-1/20% Nylon 6I/6T-2 |
| 4 | 0.28 | EVOH-1 |
| 5 | 0.23 | 80% Nylon 6-1/20% Nylon 6I/6T-2 |
| 6 | 0.28 | MA-LLDPE-3 |
| 7 | 0.70 | 88% LLDPE-1/10% LDPE-2/2% LLDPE-2 |
| 8 | 0.53 | 94% VLDPE-1/6% LDPE-3 |

Inventive Film 2

| Layer | Gauge (mils) | Component |
|---|---|---|
| 1 | 0.46 | 96% Nylon 6-3/2% Nylon 6-4/2% Nylon 6-5 |
| 2 | 0.81 | MA-EVA-1 |
| 3 | 0.23 | 80% Nylon 6-1/20% Nylon 6I/6T-2 |
| 4 | 0.28 | EVOH-2 |
| 5 | 0.23 | 80% Nylon 6-1/20% Nylon 6I/6T-2 |
| 6 | 0.28 | MA-LLDPE-3 |
| 7 | 0.70 | 88% LLDPE-1/10% LDPE-2/2% LLDPE-2 |
| 8 | 0.53 | 94% VLDPE-1/6% LDPE-3 |

Comparative Film 3

| Layer | Gauge (mils) | Component |
|---|---|---|
| 1 | 1.30 | 96% Nylon 6-3/2% Nylon 6-4/2% Nylon 6-5 |
| 2 | 2.30 | MA-EVA-1 |
| 3 | 0.65 | 80% Nylon 6-1/20% Nylon 6I/6T-2 |
| 4 | 0.80 | EVOH-1 |
| 5 | 0.65 | 80% Nylon 6-1/20% Nylon 6I/6T-2 |
| 6 | 0.80 | MA-LLDPE-3 |
| 7 | 2.00 | 88% LLDPE-1/10% LDPE-2/2% LLDPE-2 |
| 8 | 1.50 | 94% VLDPE-1/6% LDPE-3 |

Inventive Film 3

| Layer | Gauge (mils) | Component |
|---|---|---|
| 1 | 1.30 | 96% Nylon 6-3/2% Nylon 6-4/2% Nylon 6-5 |
| 2 | 2.30 | MA-EVA-1 |
| 3 | 0.65 | 80% Nylon 6-1/20% Nylon 6I/6T-2 |
| 4 | 0.80 | EVOH-2 |
| 5 | 0.65 | 80% Nylon 6-1/20% Nylon 6I/6T-2 |
| 6 | 0.80 | MA-LLDPE-3 |
| 7 | 2.00 | 88% LLDPE-1/10% LDPE-2/2% LLDPE-2 |
| 8 | 1.50 | 94% VLDPE-1/6% LDPE-3 |

TABLE 1

Control Sample Identification

| Sample No. | FILM IDENTIFICATION | Film thickness (mils) | Film Age | Radiation (kGy) |
|---|---|---|---|---|
| Control 1 | Comparative Film 1 | 6 | Post EB | 50 |
| Control 2 | Comparative Film 1 | 6 | Post EB | 100 |
| Control 3 | Comparative Film 1 | 6 | Fresh* | — |
| Control 4 | Comparative Film 1 | 6 | 6 months | — |
| Control 5 | Comparative Film 1 | 6 | 6 mo. Post EB | 50 |
| Control 6 | Comparative Film 1 | 6 | 6 mo. Post EB | 100 |
| Control 7 | Comparative Film 2 | 3.5 | Post EB | 50 |
| Control 8 | Comparative Film 2 | 3.5 | Post EB | 100 |
| Control 9 | Comparative Film 2 | 3.5 | Fresh* | — |
| Control 10 | Comparative Film 2 | 3.5 | 6 months | — |
| Control 11 | Comparative Film 2 | 3.5 | 6 mo post EB | 50 |
| Control 12 | Comparative Film 2 | 3.5 | 6 mo post EB | 100 |

Fresh* less than 14 days old.

TABLE 2

Oxygen Ingress Data For Control Samples 1-12

| Sample No. | Days (0) | Days (7) | Days (14) | Days (21) | Days (28) | Days (35) | Days (49) | Days (70) | Days (91) | Days (112) | Days (133) | Days (154) |
|---|---|---|---|---|---|---|---|---|---|---|---|---|
| Control 1 | 0.0541 | 0.0661 | 0.0683 | 0.0741 | 0.093 | 0.113 | 0.13 | 0.198 | 0.291 | 0.414 | 0.568 | 0.762 |
| Control 2 | 0.0876 | 0.0892 | 0.0795 | 0.0783 | 0.0899 | 0.103 | 0.131 | 0.189 | 0.262 | 0.376 | 0.525 | 0.696 |
| Control 3 | 0.0358 | 0.0583 | 0.0817 | 0.13 | 0.161 | 0.201 | 0.285 | 0.466 | 0.559 | 0.718 | 0.867 | 1.11 |
| Control 4 | 0.0366 | 0.0435 | 0.0666 | 0.087 | — | 0.176 | 0.138 | 0.227 | — | — | 0.439 | 0.586 |
| Control 5 | 0.018 | 0.0225 | 0.0337 | 0.0648 | 0.102 | 0.122 | 0.154 | 0.234 | 0.293 | | | |
| Control 6 | 0.0137 | 0.0396 | 0.0675 | 0.101 | 0.132 | 0.165 | 0.185 | 0.268 | 0.341 | | | |
| Control 7 | 0.0685 | 0.0836 | 0.0978 | 0.105 | 0.122 | 0.133 | 0.163 | 0.227 | 0.30 | 0.408 | 0.533 | 0.681 |
| Control 8 | 0.0615 | 0.0709 | 0.0823 | 0.0967 | 0.115 | 0.124 | 0.156 | 0.210 | 0.279 | 0.382 | 0.522 | 0.686 |
| Control 9 | 0.0275 | 0.0559 | 0.0738 | 0.113 | 0.14 | 0.18 | 0.249 | 0.398 | 0.485 | 0.631 | 0.776 | 1.01 |
| Control 10 | 0.0555 | 0.0735 | 0.0933 | 0.116 | — | 0.674 | 0.699 | 0.789 | — | — | 1.01 | 1.14 |
| Control 11 | 0.0065 | 0.0123 | 0.0293 | 0.0423 | 0.0715 | 0.0959 | 0.124 | 0.198 | 0.261 | | | |
| Control 12 | 0.0118 | 0.013 | 0.0305 | 0.0515 | 0.0714 | 0.0953 | 0.13 | 0.2 | 0.277 | | | |

The samples of the 3.5 and 6 mil thick films aged for six months and then were exposed to electron beam radiation dosage of either 50 or 100 kGy. The samples were then formed into sample pouches and tested for oxygen ingress. Oxygen ingress testing was determined by preparing 4"×7" pouches that were prepared in triplicate for each film and test condition. The pouches were vacuum sealed. The vacuum packaged pouches were inflated with 300 cm$^3$ of nitrogen using a large syringe and then 10 ml of water was added. The oxygen level in each pouch was measured immediately after inflation using a Mocon Analyzer (PAC CHECK™ 650, 8 cm$^3$ auto-injection) equipped with a charcoal filter. Unless otherwise stated, the samples were stored at room temperature. Oxygen data for the interior of the pouches was collected at various intervals in order to determine the amount of oxygen that had ingressed into the pouch over a period of time. Additionally the e-Beam treated samples were aged under a nitrogen atmosphere for 6 months and then formed into pouches and re-tested for oxygen ingress to measure the shelf-life of the e-beam treated films. The sample characteristics and oxygen ingress data for the Control Samples and Inventive Samples are shown in Tables 1 through 6 and in FIGS. 3 through 9.

TABLE 3

Sample Identification

| Sample No. | FILM IDENTIFICATION | Film thickness (mils) | Film Age | Radiation (kGy) |
|---|---|---|---|---|
| Sample 1 | Inventive Film 1 | 6 | Post EB | 50 |
| Sample 2 | Inventive Film 1 | 6 | Post EB | 100 |
| Sample 3 | Inventive Film 1 | 6 | Fresh* | — |
| Sample 4 | Inventive Film 1 | 6 | 6 months | — |
| Sample 5 | Inventive Film 1 | 6 | 6 mo Post EB | 50 |
| Sample 6 | Inventive Film 1 | 6 | 6 mo Post EB | 100 |
| Sample 7 | Inventive Film 2 | 3.5 | Post EB | 50 |
| Sample 8 | Inventive Film 2 | 3.5 | Post EB | 100 |
| Sample 9 | Inventive Film 2 | 3.5 | Fresh* | — |
| Sample 10 | Inventive Film 2 | 3.5 | 6 months | — |
| Sample 11 | Inventive Film 2 | 3.5 | 6 mo post EB | 50 |
| Sample 12 | Inventive Film 2 | 3.5 | 6 mo post EB | 100 |

Fresh* less than 14 days old.

TABLE 4

Oxygen Ingress Data For Samples 1-12

| Sample No. | Days (0) | Days (7) | Days (14) | Days (21) | Days (28) | Days (35) | Days (49) | Days (70) | Days (91) | Days (112) | Days (133) | Days (154) |
|---|---|---|---|---|---|---|---|---|---|---|---|---|
| Sample 1 | 0.0781 | 0.0885 | 0.0807 | 0.0728 | 0.0635 | 0.0637 | 0.0665 | 0.0427 | 0.0464 | 0.0573 | 0.0695 | 0.0875 |
| Sample 2 | 0.105 | 0.129 | 0.129 | 0.0984 | 0.104 | 0.0788 | 0.0782 | 0.0229 | .0191 | 0.0235 | 0.0334 | 0.0607 |
| Sample 3 | 0.0416 | 0.0387 | 0.0349 | 0.0415 | .0428 | 0.0453 | 0.0599 | 0.109 | 0.134 | 0.198 | 0.261 | 0.353 |
| Sample 4 | 0.0436 | 0.0505 | 0.0579 | 0.0624 | — | 0.0861 | 0.0913 | 0.142 | — | — | 0.241 | 0.29 |
| Sample 5 | 0.0077 | 0.0157 | 0.017 | 0.0146 | 0.0171 | 0.0108 | 0.0127 | 0.0186 | 0.0228 | | | |
| Sample 6 | 0.0082 | 0.0123 | 0.0132 | 0.0067 | 0.004 | 0 | 0 | 0 | 0 | | | |
| Sample 7 | 0.0682 | 0.0744 | 1.0695 | 0.0653 | 0.0622 | 0.0597 | 0.083 | 0.0935 | 0.138 | 0.218 | 0.329 | 0.49 |
| Sample 8 | 0.0658 | 0.0698 | 0.0615 | 0.0586 | 0.0569 | 0.0541 | 0.057 | 0.0604 | 0.0725 | 0.096 | 0.141 | 0.235 |
| Sample 9 | 0.0321 | 0.02921 | 0.0239 | 0.0296 | 0.0293 | 0.031 | 0.0396 | .0729 | 0.101 | 0.172 | 0.263 | 0.359 |
| Sample 10 | 0.0319 | 0.0394 | 0.0473 | 0.0484 | — | 0.0592 | 0.061 | 0.0992 | — | — | 0.261 | 0.392 |
| Sample 11 | 0.0068 | 0.0103 | 0.0084 | 0.004 | 0.0027 | 0.0002 | 0.0057 | 0.015 | 0.0176 | | | |
| Sample 12 | 0.0136 | 0.0325 | 0.0285 | 0.0191 | 0.0184 | 0.0153 | 0.0188 | 0.0421 | 0.0673 | | | |

Tables 5 and 6 below, compare the decrease in oxygen ingress into pouches that are formed from irradiated films of the invention that include EVOH-2 in comparison to the Control films which do not include EVOH-2. As shown in the following Tables, the electron beam treatment causes a decrease in ingress (or increase in oxygen scavenged) ranging from 0 to 88% depending on length of time the samples were tested and the dosage of electron beam radiation to which the films were exposed. For example, Sample 2 treated with 100 kGy of electron beam radiation showed a 25% decrease in oxygen ingress into the package after 35 days and an 88% decrease after 70 days. Sample 8 treated with 100 kGy of electron beam radiation showed a 25% decrease in oxygen ingress into the package after 14 days and a 71% decrease after 70 days. The samples that were treated with an electron beam dosage of 50 kGy were slightly slower. Additionally, the 3.5 mils films reacted faster in response to the electron beam treatment.

TABLE 5

Films exposed to an irradiation dosage of 100 kGy

| Sample No. | Film thickness (mils) | Radiation (kGy) | 0 Days | 7 Days | 14 Days | 21 Days | 28 Days | 35 Days | 49 Days | 70 Days |
|---|---|---|---|---|---|---|---|---|---|---|
| Control 2 | 6 | 100 | 0.0876 | 0.0892 | 0.0795 | 0.0783 | 0.0899 | 0.103 | 0.131 | 0.189 |
| Sample 2 | 6 | 100 | 0.105 | 0.129 | 0.129 | 0.0984 | 0.104 | 0.0778 | 0.0782 | 0.0229 |
| Percent Decrease in Ingress | | | −19.863 | −44.619 | −62.264 | −25.670 | −15.684 | 24.466 | 40.305 | 87.884 |
| Control 8 | 3.5 | 100 | 0.0615 | 0.0709 | 0.0823 | 0.0967 | 0.115 | 0.124 | 0.156 | 0.21 |
| Sample 8 | 3.5 | 100 | 0.0658 | 0.0698 | 0.0615 | 0.0586 | 0.0569 | 0.0541 | 0.057 | 0.0604 |
| Percent Decrease in Ingress | | | −6.992 | 1.551 | 25.273 | 39.400 | 50.522 | 56.371 | 63.461 | 71.238 |

TABLE 6

Films exposed to an irradiation dosage of 50 kGy

| Samples | Film thickness (mils) | Radiation (kGy) | 0 Days | 7 Days | 14 Days | 21 Days | 28 Days | 35 Days | 49 Days | 70 Days |
|---|---|---|---|---|---|---|---|---|---|---|
| Control 1 | 6 | 50 | 0.0541 | 0.0661 | 0.0683 | 0.0741 | 0.093 | 0.113 | 0.130 | 0.198 |
| Sample 1 | 6 | 50 | 0.0781 | 0.0885 | 0.0807 | 0.0728 | 0.0635 | 0.0637 | 0.0665 | 0.0427 |
| Percent Decrease in Ingress | | | −44.362 | −33.888 | −18.155 | 1.754 | 31.720 | 43.628 | 48.846 | 78.434 |
| Control 7 | 3.5 | 50 | 0.0685 | 0.0836 | 0.0978 | 0.105 | 0.122 | 0.133 | 0.163 | 0.227 |
| Sample 7 | 3.5 | 50 | 0.0682 | 0.0744 | 0.0695 | 0.0653 | 0.0622 | 0.0597 | 0.083 | 0.0935 |
| Percent Decrease in Ingress | | | 0.438 | 11.005 | 28.937 | 37.810 | 49.016 | 55.113 | 49.080 | 58.810 |

Figure 3:
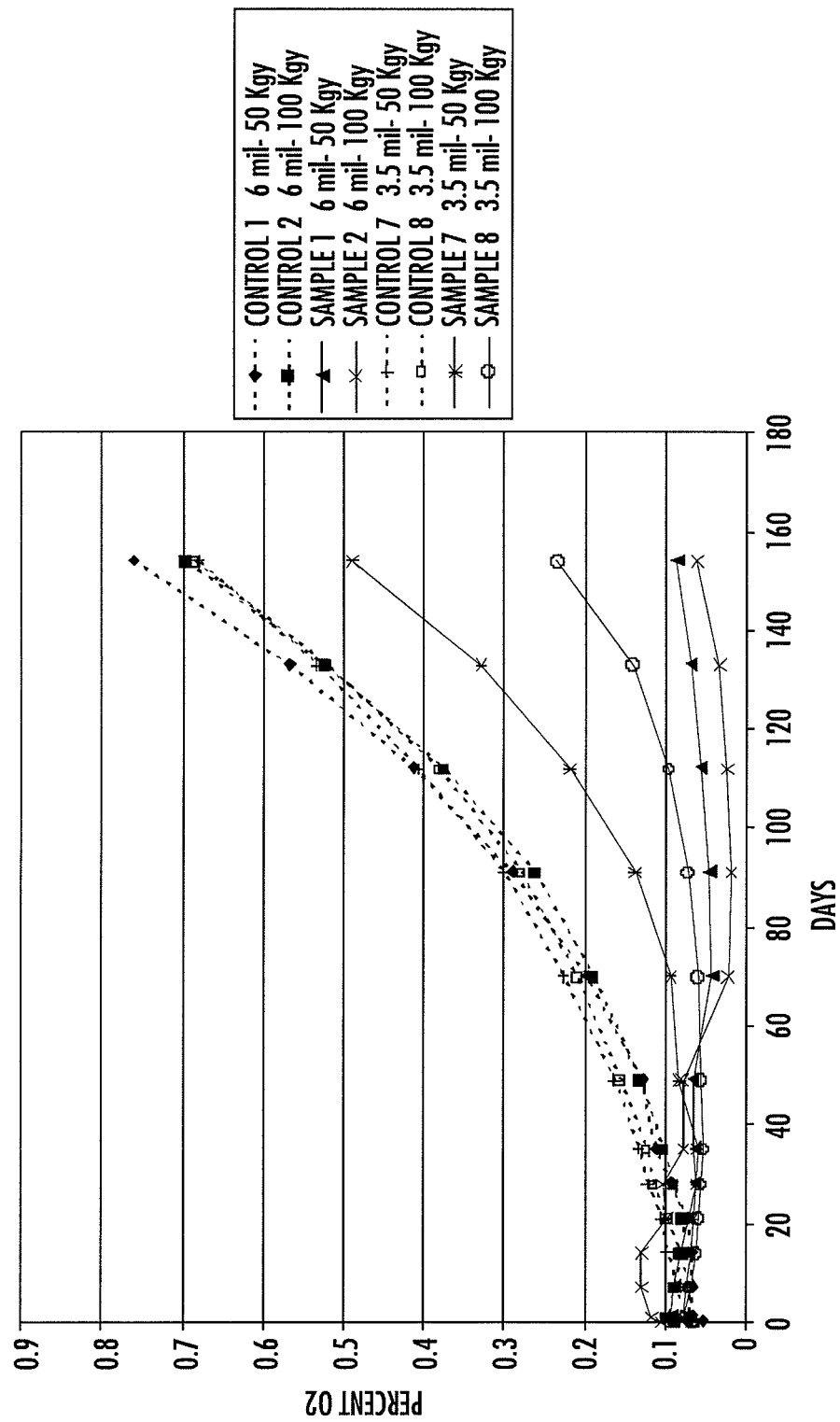
FIG. 3 is a graph that plots percent $O_2$ in the interior of pouches as a function of time to illustrate the effect of electron beam treatment for both inventive and control films.

FIG. 3 is a graphical plot that illustrates the percent oxygen in the interior of the pouch over a 160 day test period. The control samples and the inventive samples were exposed to electron beam radiation at a dosage of either 50 or 100 kGy. It can be seen from FIG. 3, that the samples containing the active oxygen barrier composition have improved active oxygen barrier properties in comparison to the control samples. For example, the control samples generally show ingress of oxygen from the beginning of the test period, whereas the inventive films have significantly less oxygen ingress during the course of the test period. The 3.5 mil films began to show some ingress of oxygen after about 75 days, and the 6 mil film continued to show low oxygen ingress for most, if not all, of the 160 day test period. In contrast, the control films which did not contain the active oxygen barrier composition steadily ingressed from day one and did not seem to be affected by the electron beam treatment. It can be seen from the data in FIG. 3 that the enhanced oxygen barrier properties of the inventive films is attributable to the presence of the active oxygen barrier composition and not to any other film components that may have been triggered by the electron beam treatment.

Figure 4:
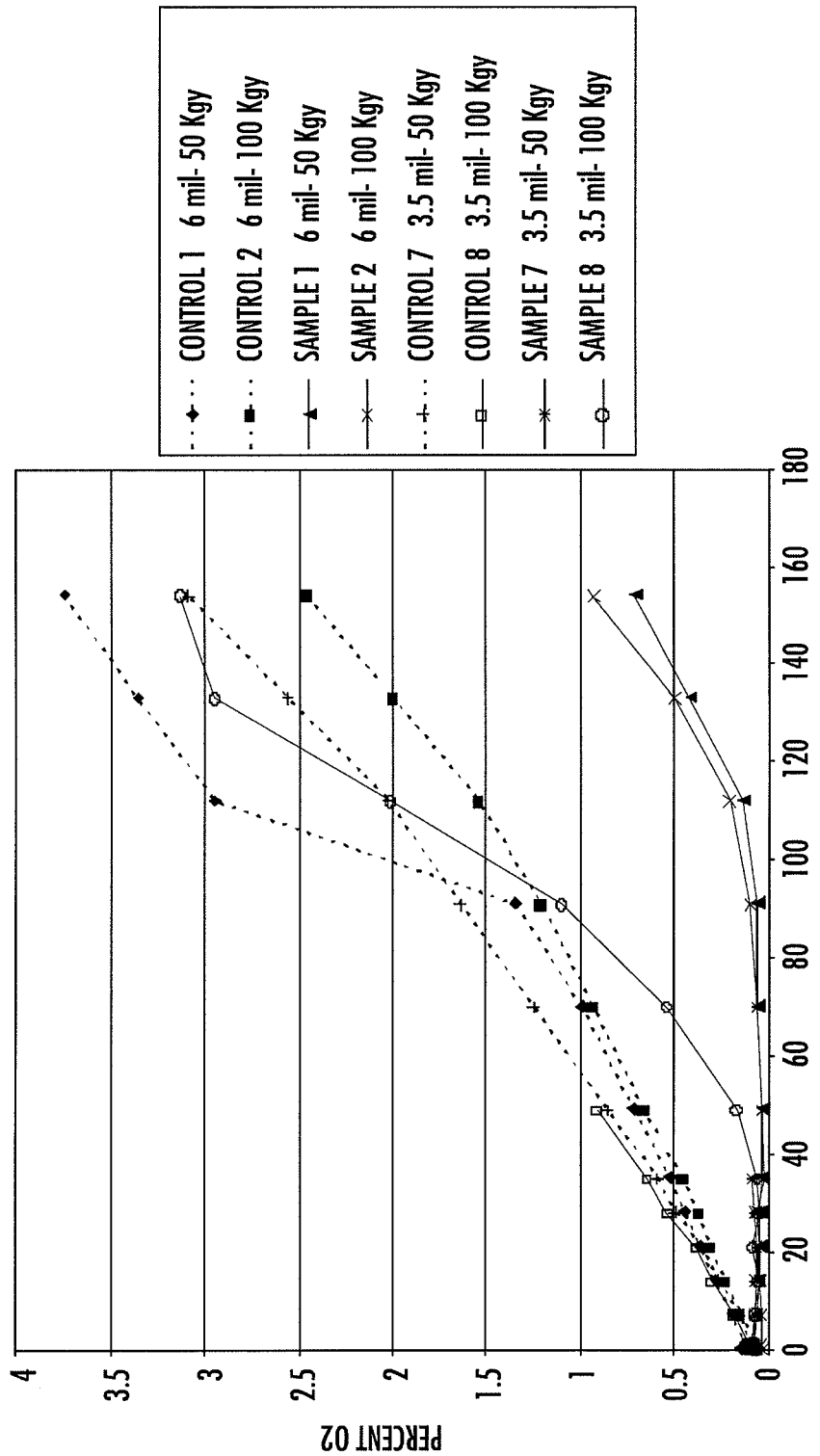
FIG. 4 is a graph that plots percent $O_2$ in the interior of pouches as a function of time to illustrate the effect of electron beam treatment for both inventive and control films that have been aged in an oven at a temperature of 40° C.

FIG. 4 is a graphical plot that shows the effect of oven temperature accelerated aging of the films. During the 160 day test period, the control samples and inventive samples were maintained in an oven at a temperature of 40° C. One day at 40° C. is approximately equivalent to 4 days of room temperature storage. The data shows that the inventive films have significantly less oxygen ingress into the interior of the pouch over the 160 day test period. In this test, the 3.5 mil films began to show an increase in oxygen ingress after about 40 days, and eventually had a higher ingress than the controls after about 110 days. However, the 6 mil films maintained no/low ingress for over 100 days before the oxygen scavenging capacity of the films was exhausted. As in the previously discussed trial, the control samples steadily ingressed from day one and did not appear to be affected by the electron beam treatment.

Figure 5:
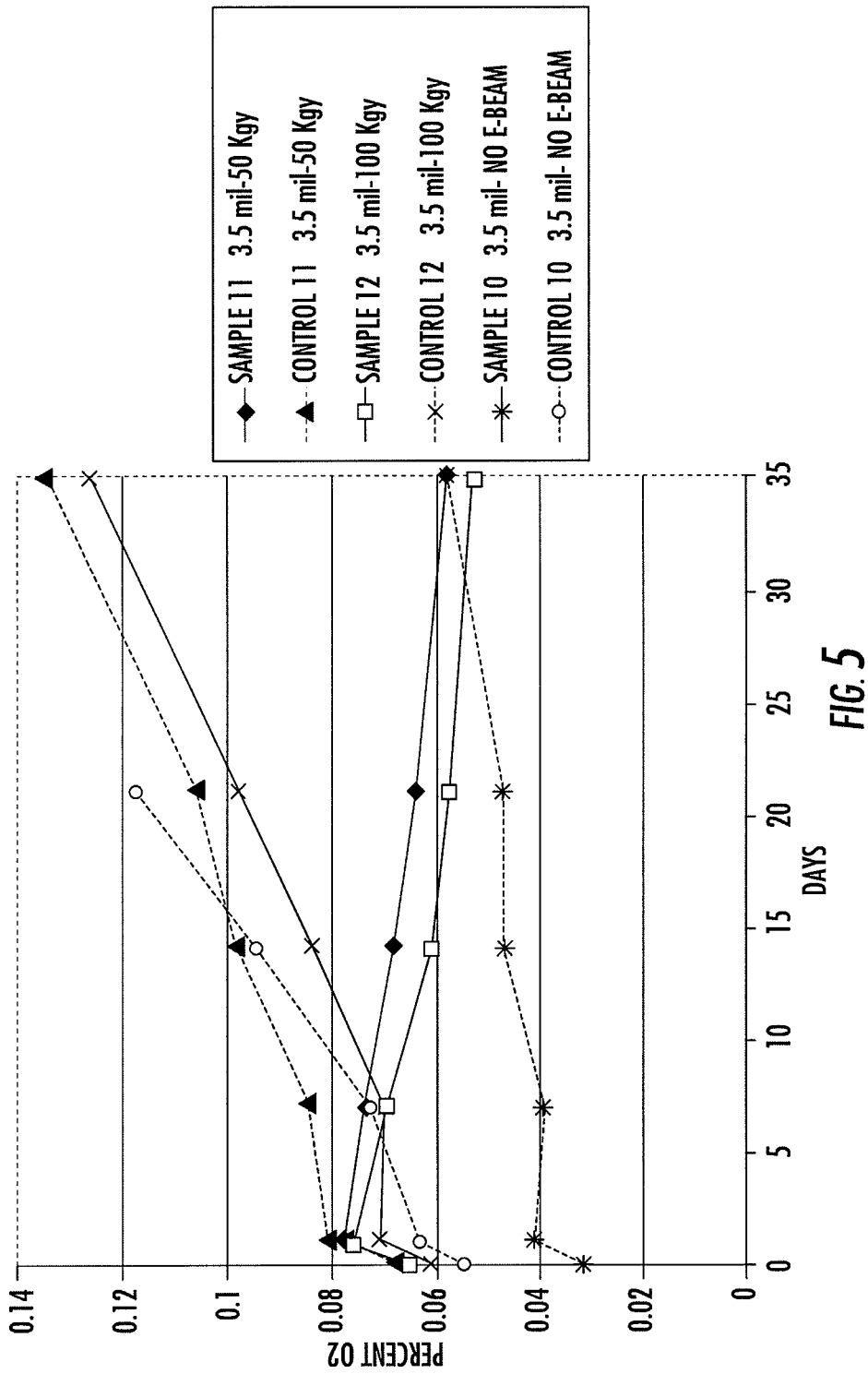
FIG. 5 is a graph that plots percent $O_2$ in the interior of pouches as a function of time to illustrate the effect of electron beam treatment on both control and inventive films that have a thickness of 3.5 mil and have been aged for 6 months.
Figure 6:
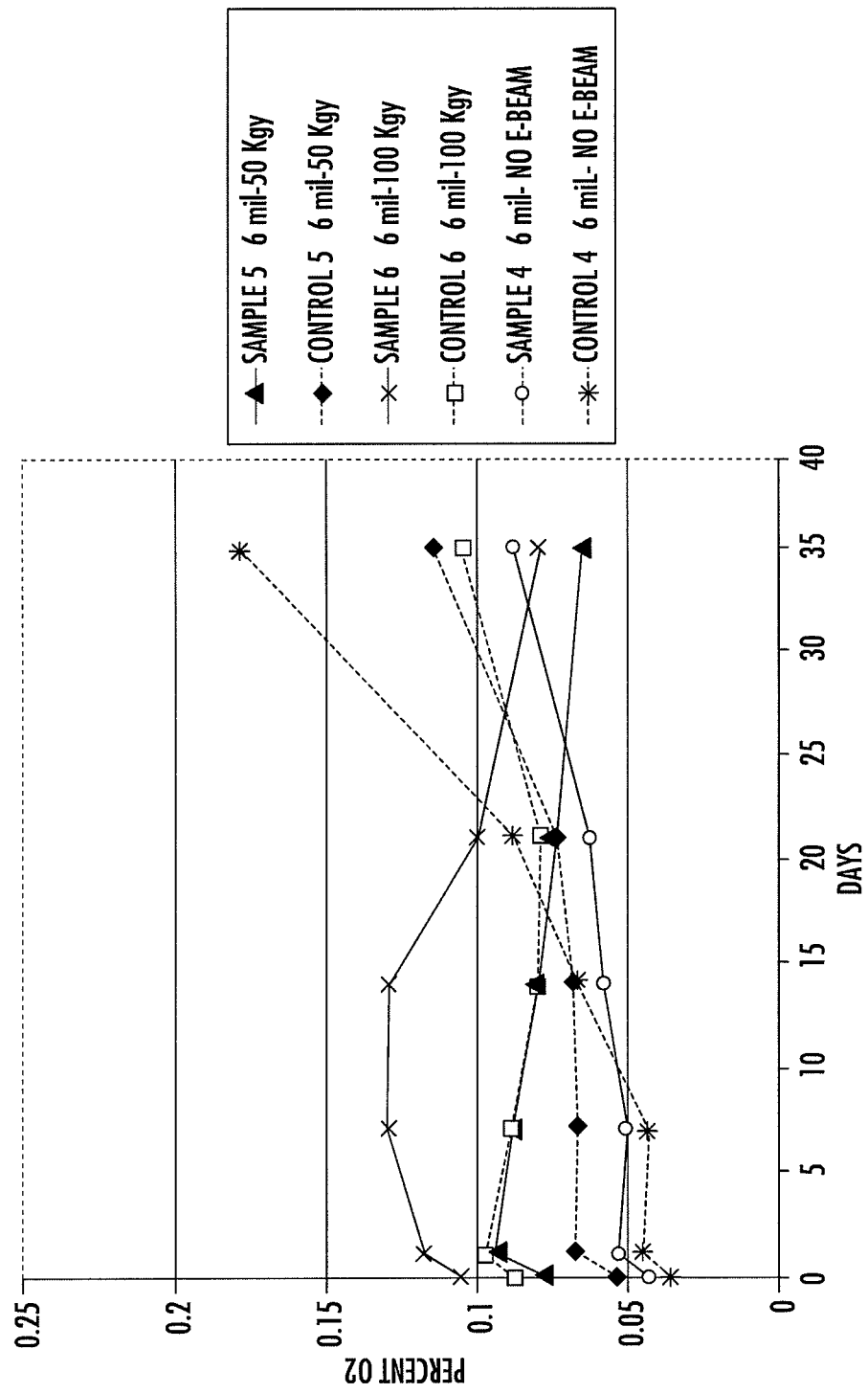
FIG. 6 is a graph that plots percent $O_2$ in the interior of pouches as a function of time to illustrate the effect of electron beam treatment on both control and inventive films that have a thickness of 6 mil and have been aged for 6 months.

FIGS. 5 and 6 are graphical plots that compare the oxygen ingress for electron beam treated films and non-electron beam treated films. FIG. 5 is for 3.5 mil films and FIG. 6 is for 6 mil films. Both films were aged for 6 months prior to being treated with electron beam radiation. The data in both FIGS. show that the untreated films have steady oxygen ingress, while the inventive films that have been exposed to electron-beam radiation have no/low oxygen ingress over the same time period.

In addition, the electron beam treated active barrier films also show a steady decrease in the headspace oxygen level within the pouch in comparison to the same film that was not exposed to the electron beam. For example, Sample 10 did not receive a dosage of electron beam radiation. As shown in FIG. 5, Sample 10 showed a slow ingress of oxygen into the pouch whereas the same films that were treated with electron beam radiation (Samples 7 and 8) showed a steady decrease in oxygen ingress into the interior of the pouch. FIG. 6 shows similar results for the 6 mil films. As a result, it can be seen that treatment with electron beam radiation improves active oxygen barrier properties of the film and actually results in head space oxygen scavenging within the interior of the pouch. Thus, treating the inventive films with electron beam radiation improves the active oxygen barrier performance of the films.

In Table 7 below, a non-irradiated 6 month film is compared to an e-beam film. The e-beam treated film was already 6 months old at time of treatment with the e-beam. As a result, the samples did not start at the same oxygen level. However, it can be seen that by Day 35, both the 50 and the 100 KGy irradiated samples had scavenged headspace oxygen and showed approximately 55% less oxygen in the pouch and by day 154 had approximately 90% less oxygen in the pouch. The irradiated films were decreasing the percent oxygen in the pouch while the non-irradiated samples continued to ingress. The same is seen for the 3.5 mil samples, at day 35 the samples both showed 80% less oxygen in the pouch although after about 70 days they began to slowly ingress, indicating the sample was expended.

TABLE 7

Comparison of non-irradiated film with irradiated film.

| Sample No. | FILM IDENTIFICATION | Film thickness (mils) | Film Age | Radiation (kGy) | Days 0 | Days 7 | Days 14 | Days 21 | Days 35 | Days 49 | Days 70 | Days 133 | Days 154 |
|---|---|---|---|---|---|---|---|---|---|---|---|---|---|
| Control 4 | Comparative Film 1 | 6 | 6 months | none | 0.0366 | 0.0435 | 0.0666 | 0.087 | 0.176 | 0.138 | 0.227 | 0.439 | 0.586 |
| Control 2 | Inventive Film 1 | 6 | Post EB | 100 | 0.105 | 0.129 | 0.129 | 0.0984 | 0.0788 | 0.0782 | 0.0229 | 0.0334 | 0.0607 |
| | Percent Decrease in Ingress | | | | −186.885 | −196.552 | −93.694 | −13.103 | 55.227 | 43.333 | 89.912 | 92.392 | 89.642 |
| Control 4 | Comparative Film 1 | 6 | 6 months | none | 0.0366 | 0.0435 | 0.0666 | 0.087 | 0.176 | 0.138 | 0.227 | 0.439 | 0.586 |
| Control 1 | Inventive Film 1 | 6 | Post EB | 50 | 0.0781 | 0.0885 | 0.0807 | 0.0728 | 0.0637 | 0.0665 | 0.0427 | 0.0695 | 0.0875 |
| | Percent Decrease in Ingress | | | | −113.388 | −103.448 | −21.171 | 16.322 | 63.807 | 51.812 | 81.189 | 84.169 | 85.068 |
| Control 10 | Comparative Film 2 | 3.5 | 6 months | none | 0.0555 | 0.0735 | 0.0933 | 0.116 | 0.674 | 0.699 | 0.789 | 1.01 | 1.14 |
| Control 8 | Comparative Film 2 | 3.5 | Post EB | 100 | 0.0615 | 0.0709 | 0.0823 | 0.0967 | 0.124 | 0.156 | 0.21 | 0.522 | 0.686 |
| | Percent Decrease in Ingress | | | | −10.811 | 3.537 | 11.790 | 16.6381 | 81.602 | 77.682 | 73.384 | 48.317 | 39.825 |
| Control 10 | Comparative Film 2 | 3.5 | 6 months | none | 0.0555 | 0.0735 | 0.0933 | 0.116 | 0.674 | 0.699 | 0.789 | 1.01 | 1.14 |
| Control 7 | Comparative Film 2 | 3.5 | Post EB | 50 | 0.0685 | 0.0836 | 0.0978 | 0.105 | 0.133 | 0.163 | 0.227 | 0.533 | 0.681 |
| | | | | | −23.423 | −13.741 | −4.823 | 9.483 | 80.267 | 76.681 | 71.229 | 47.228 | 40.263 |

Figure 7:
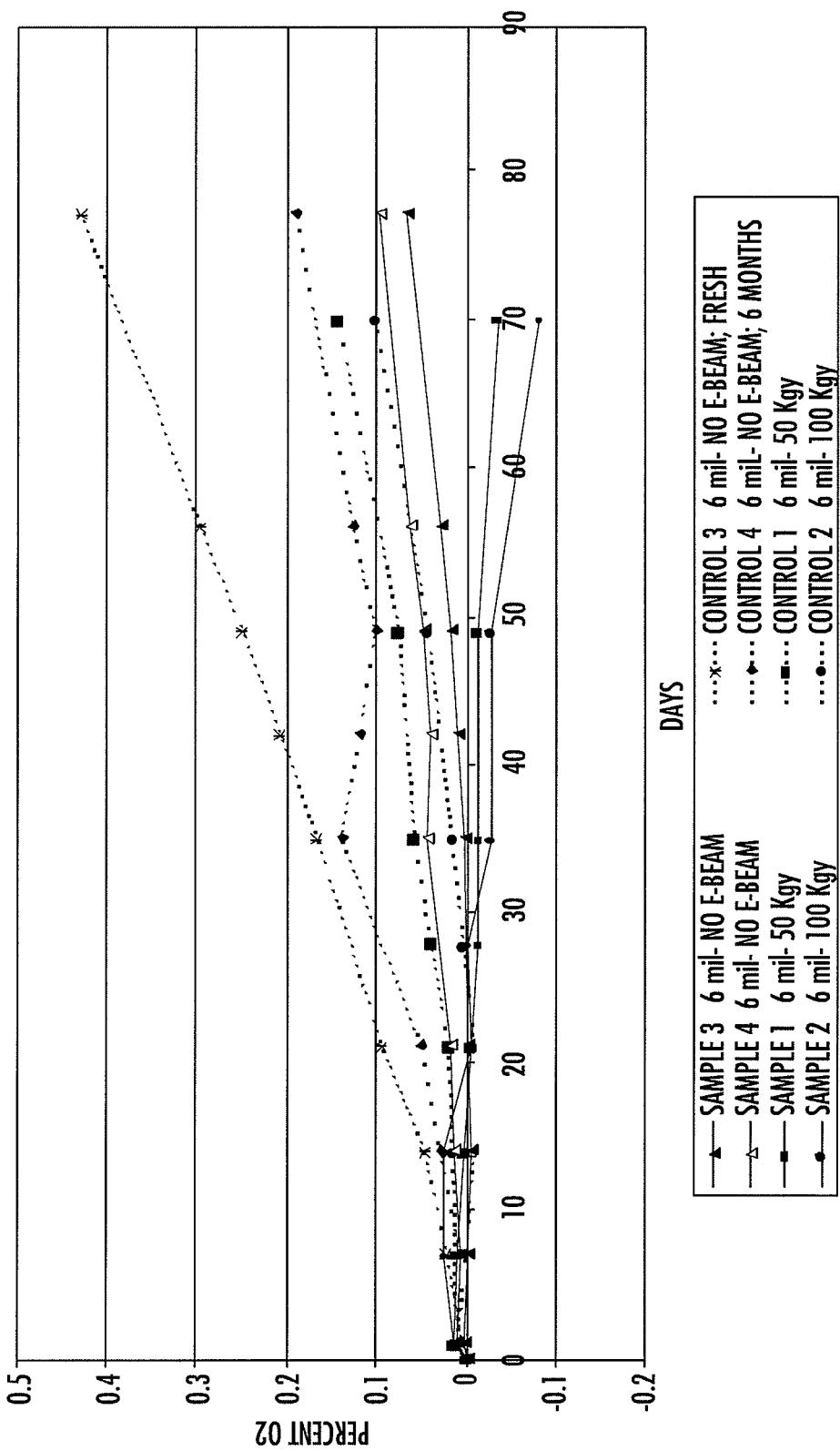
FIG. 7 is a graph that plots percent $O_2$ in the interior of pouches as a function of time and compares 6 mil inventive films that have been exposed to electron beam radiation to inventive films that have not been exposed to electron beam radiation, tested when freshly prepared and after aging 6 months.

In FIG. 7, the active oxygen barrier properties of the 6 mil films were compared for fresh films (Sample 3), films that were permitted to age for 6 months prior to electron beam treatment (Sample 4), and inventive films (Samples 1 and 2) that were electron beam treated after aging 6 months. The sample films are compared with the control films. The films were normalized to a starting point of zero and the resulting graphs were overlaid. The sets all have a zero start and permits comparison of the slopes of the oxygen ingress curves. The data in FIG. 7 shows, as seen previously, that the fresh films and the 6 month aged films have similar performances, and that electron beam treatment improves the active oxygen barrier performance of the films. It can be seen in FIG. 7 that the "Fresh" film, which was tested immediately after manufacture and the same film tested after aging 6 months had similar oxygen ingress performance, and therefore the age of the film did not diminish the active barrier performance of the film.

Figure 8:
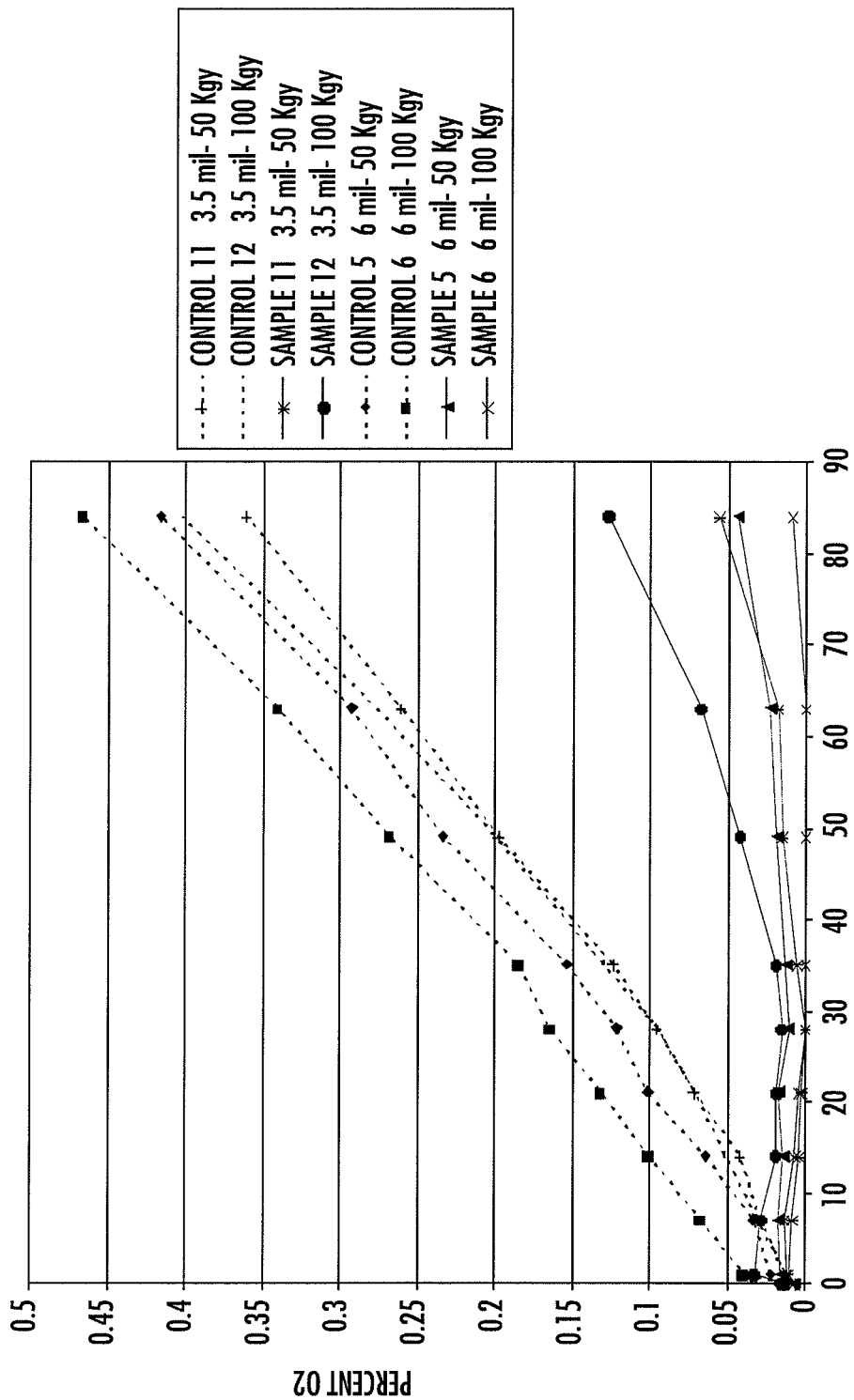
FIG. 8 is a graph that plots percent $O_2$ in the interior of pouches as a function of time to compare the affects of 6 months storage on the active barrier properties of electron beam treated film versus control films.

In FIGS. 8 and 9 the shelf-life of the electron beam treated films was evaluated. In this trial the samples and controls were treated with electron beam radiation and then stored under nitrogen flush conditions for 6 months. Pouches were then made from the films as previously described. The films in FIG. 8 were stored at room temperature whereas the films in FIG. 9 were stored under accelerated aging conditions in an oven at 40° C. The samples in FIG. 8 had significantly less oxygen ingress and actually had oxygen headspace scavenging. In comparison, the control films had steady oxygen ingress from day one of the test period. The films in FIG. 9 showed similar results. In particular, the 3.5 mil films began to show some oxygen ingress after about 30 days of accelerated aging (equivalent to about 120 days at room temperature) before oxygen ingress sharply increased due to depletion of the capacity of the active barrier component. The 6 mil film continued to show no/low ingress throughout the 85 day test period.

Multilayer films in accordance with the invention can also have heat shrinkable attributes. The following is an example of a heat shrinkable active barrier film that is in accordance with one embodiment of the invention. The film in the example has a seven-layer structure as described below. Films having a final total thickness of about 2.0 mils can also be prepared. After extrusion the film is exposed to an irradiation dosage of 50 kGy. The irradiated film is then subject to the trap bubble method discussed above to impart heat shrinkable attributes to the film. The resulting film exhibits a free shrink (ASTM D 2732) of at least 8% in the longitudinal direction, and/or at least 8% in the transverse direction when heated to a temperature of 185° F.

Inventive Film 4

| Layer | Gauge (mils) | Component |
|---|---|---|
| 1 | 0.48 | 0.15% Silica, 0.6% Erucamide, 0.75% EVA-1, 69.5% LLDPE-3, 23% MDPE-1 |
| 2 | 0.18 | MA-LLDPE/LDPE-4 |
| 3 | 0.20 | 80% Nylon 6/66, 20% Nylon 6-6 |
| 4 | 0.32 | EVOH-2 |
| 5 | 0.20 | 80% Nylon 6/66, 20% Nylon 6-6 |
| 6 | 0.18 | MA-LLDPE/LDPE-4 |
| 7 | 0.48 | 75% LLDPE-3, 25% MDPE-1 |

The materials used in Inventive Film 4 are identified below.

Silica: SUPERFINE SUPERFLOSS™ from Celite Corporation.

Erucamide: is KEMAMIDE E ULTRA™ and is purchased from Chemtura Corporation.

EVA-1: is PE1335™, 3.3% VA ethylene vinyl acetate available from Huntsman Corporation.

LLDPE-3: is DOWLEX™ 2045.04 Ziegler-Natta linear low density ethylene/octene copolymer with a density of 0.918 g/cc and a melt index of 2.5 g/10 minutes and is available from Dow Corporation.

MDPE-1: is DOWLEX™ 2037 Ziegler-Natta medium density ethylene/octene copolymer with a density of 0.935 g/cc and a melt index of 2.5 g/10 minutes available from Dow Corporation.

MA-LLDPE/LDPE-4: is EQUISTAR™ PX3227, a maleic anhydride grafted blend of linear low density polyethylene and low density polyethylene having a melt index of 1.7 g/10 min. and a density of 0.912 g/cc available from Equistar Corporation.

Nylon 6/66-1: is ULTRAMID™ C33 01, Poly(caprolactam/hexamethylenediamine/adipic acid) which has a density of 1.13 g/cc and is available from BASF.

Nylon 6-6: is SURLYN™ AM 7927, Zinc Neutralized Ethylene Methacrylic Acid Copolymer+Polyamide (an ionomer and nylon blend with a nominal 11% methacrylic acid content) which has a melt index of 11.5 g/10 min. and a density of 0.98 g/cc available from the DuPont Corporation.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An active oxygen barrier film comprising an irradiated multilayer film having an active oxygen barrier layer comprising an oxygen scavenging composition that is a blend of:
   (A) a thermoplastic resin having carbon-carbon double bonds substantially in its main chain;
   (B) a transition metal salt; and
   (C) an oxygen barrier polymer,
   wherein the oxygen scavenging composition has active oxygen barrier properties prior to irradiation, and the active oxygen barrier layer is disposed between an outer sealant layer and an outer abuse layer, wherein the multilayer film has been irradiated with an electron beam radiation dosage between about 2 and 200 kilo Gray, and wherein the film has an oxygen scavenging rate that is at least about 0.01 cc oxygen per day per gram of the oxygen scavenging composition blend; and the film exhibits a higher rate of oxygen scavenging in comparison to the same film prior to irradiation.

2. The active oxygen barrier film of claim 1, wherein the thermoplastic resin (A) comprises at least one of the units represented by formula (I) and formula (II):

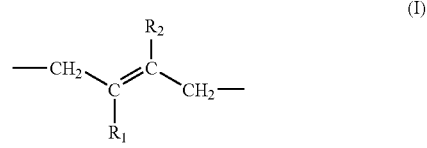

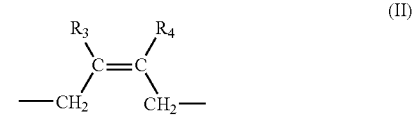

wherein $R_1, R_2, R_3$ and $R_4$ are the same or different, a hydrogen atom, a substituted or non-substituted alkyl group, a substituted or non-substituted aryl group, a substituted or non-substituted alkylaryl group, —$COOR_5$, —$OCOR_6$, a cyano group or a halogen atom, and $R_3$ and $R_4$ are capable of forming a ring via a methylene group or an oxymethylene group, and wherein $R_5$ and $R_6$ are a substituted or nonsubstituted alkyl group, a substituted or non-substituted aryl group, or a substituted or non-substituted alkylaryl group.

3. The active oxygen barrier film of claim 1, wherein the thermoplastic resin (A) comprises at least one of the units represented by formula (I) and formula (II): wherein $R_1$, $R_2$, $R_3$ and $R_4$ are hydrogen atoms.

4. The active oxygen barrier film of claim 1, wherein in the thermoplastic resin (A), has adjacent carbon-carbon double bonds that are separated by at least three methylenes.

5. The active oxygen barrier film of claim 1, wherein the thermoplastic resin (A) has a unit represented by a formula (III):

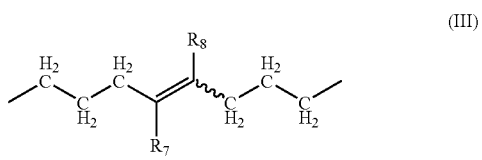

wherein $R_7$ and $R_8$ are each independently a hydrogen atom, a substituted or nonsubstituted alkyl group, a substituted or non-substituted aryl group, a substituted or non-substituted alkylaryl group, —$COOR_9$, —$OCOR_{10}$, a cyano group, or a halogen atom, and $R_9$ and $R_{10}$ are each independently a hydrogen atom, or an alkyl group having 1 to 10 carbon atoms.

6. The active oxygen barrier film of claim 1, wherein the thermoplastic resin (A) is at least one resin selected from the group consisting of polybutadiene, polyisoprene, polychloroprene, and polyoctenylene.

7. The active oxygen barrier film of claim 6, wherein the thermoplastic resin (A) is at least one resin selected from the group consisting of polybutadiene and polyoctenylene.

8. The active oxygen barrier film of claim 7, wherein the thermoplastic resin (A) is polyoctenylene.

9. The active oxygen barrier film of claim 1, wherein the transition metal salt (B) is at least one metal salt selected from the group consisting of an iron salt, a nickel salt, a copper salt, a manganese salt and a cobalt salt, and combinations thereof.

10. The active oxygen barrier film of claim 1, wherein the oxygen absorption amount of the thermoplastic resin (A) is at least 1.6 mols per 1 mol of carbon-carbon double bonds of the thermoplastic resin (A).

11. The active oxygen barrier film of claim 1, wherein the oxygen absorption rate of the film is at least 0.01 ml/(g·day).

12. The active oxygen barrier film of claim 1, wherein the oxygen barrier polymer (C) has an oxygen transmission rate of 500 ml·20 μm/(m²·day ·atm)or less at 65% RH at 20° C.

13. The active oxygen barrier film of claim 12, wherein the oxygen barrier polymer (C) comprises a polymer selected from the group consisting of polyvinyl alcohol, polyamide, polyvinyl chloride, polyacrylonitrile, and combinations thereof.

14. The active oxygen barrier film of claim 13, wherein the oxygen barrier polymer (C) is an ethylene-vinyl alcohol copolymer having an ethylene content of 5 to 60 mol % and a saponification degree of about 90% or more.

15. The active oxygen barrier film of claim 13, wherein the oxygen barrier polymer (C) is present in an amount of about 70 to 99 weight % and the thermoplastic resin (A) is present in an amount of 30 to 1 weight %, based on the combined weight of the thermoplastic resin (A) and the EVOH oxygen barrier polymer (C).

16. The active oxygen barrier film of claim 13, further comprising a compatibilizer (D).

17. The active oxygen barrier film of claim 16, wherein the oxygen barrier polymer (C) is present in an amount of 70 to 98.9 wt %, the thermoplastic resin (A) is present in an amount of about 1 to 29.9 weight %, and the compatibilizer (D) is present in an amount of about 0.1 to 29 weight %, based on the total weight of the thermoplastic resin (A), oxygen barrier polymer (C), and the compatibilizer (D).

18. The active oxygen barrier film of claim 1, wherein the film is heat shrinkable.

19. The active oxygen barrier film of claim 18, wherein the film has a total free shrink, at 185° F., of at least 20 percent.

20. The active oxygen barrier film of claim 18, wherein the film has a total free shrink, at 185° F., of less than 10 percent.

21. The active oxygen barrier film of claim 1, further comprising at least two intermediate adhesive layers, each of which are disposed between the core layer and a respective outer layer.

22. The active oxygen barrier film of claim 1, wherein the multilayer film has been irradiated with an electron beam radiation dosage between about 50 and 100 kilo Gray.

23. A multilayer coextruded active oxygen barrier film comprising:
(a) a core layer comprising a blend of ethylene vinyl alcohol copolymer, an oxygen scavenging composition comprising a thermoplastic resin having carbon-carbon double bonds substantially in its main chain, and a transition metal salt, and wherein the oxygen scavenging composition has active oxygen barrier properties prior to irradiation;
(b) two intermediate layers each comprising a polyamide;
(c) two outer layers; and
(d) two layers of adhesive polymeric material disposed between respective intermediate and outer layers, and wherein the film has been irradiated with an electron beam radiation dosage between about 2 and 200 kilo Gray, wherein the film has an oxygen scavenging rate that is at least about 0.01 ml/(g·day) of the core layer; and the film exhibits a higher rate of oxygen scavenging in comparison to the same film prior to irradiation.

24. The multilayer film according to claim 23, wherein the thickness of the film is between 0.5 and 30 mils, and the thickness of the core layer is between 5 and 25 percent of the overall thickness of the film.

25. The multilayer film according to claim 23, wherein the polyamide comprises nylon 6, amorphous nylon, nylon 12, and blends thereof.

26. The multilayer film according to claim 23, wherein the film exhibits a 5% decrease in oxygen ingress through the film after 35 days in comparison to the same film that has not been irradiated.

27. The multilayer film according to claim 23, wherein the film exhibits at least a 75% decrease in oxygen ingress through the film after 70 days in comparison to the same film that has not been irradiated.

28. A packaging article comprising the multilayer film according to claim 23.

29. The packaging article of claim 28, wherein an oxygen sensitive product is disposed in an interior of the packaging article.

30. A package comprising:
a) a food article; and
b) a film wrapped around at least a portion of the food article, the film comprising (i) a core layer comprising an oxygen scavenging composition that is a blend of ethylene vinyl alcohol copolymer, a thermoplastic resin having carbon-carbon double bonds substantially in its main chain, and a transition metal salt, and wherein the oxygen scavenging composition has active oxygen barrier properties prior to irradiation;

(ii) two intermediate layers each comprising a polyamide;

(iii) two outer layers; and (iv) two layers of adhesive polymeric material disposed between respective intermediate and outer layers, and wherein the film has been irradiated with an electron beam radiation dosage between about 20 and 200 kilo Gray, wherein the film has an oxygen scavenging rate that is at least about 0.01 cc oxygen per day per gram of the oxygen scavenging blend, and a total free shrink, at 185° F., of at least 20 percent; and the film exhibits a higher rate of oxygen scavenging in comparison to the same film prior to irradiation.

31. A method of packaging an oxygen-sensitive product comprising:

(a) providing a film with at least one layer comprising blend of ethylene/vinyl alcohol copolymer, an oxygen scavenging composition that is a blend of ethylene vinyl alcohol copolymer, a thermoplastic resin having carbon-carbon double bonds substantially in its main chain, and a transition metal salt, and wherein the oxygen scavenging composition has active oxygen barrier properties prior to irradiation;

(b) exposing the film to electron beam radiation of at least about 2 kilo Gray; the film exhibits a higher rate of oxygen scavenging in comparison to the same film prior to irradiation, and (c) placing the oxygen-sensitive product inside a container made from the film.

* * * * *

UNITED STATES PATENT AND TRADEMARK OFFICE
CERTIFICATE OF CORRECTION

PATENT NO. : 9,452,592 B2  
APPLICATION NO. : 11/845846  
DATED : September 27, 2016  
INVENTOR(S) : Beckwith et al.

Page 1 of 1

It is certified that error appears in the above-identified patent and that said Letters Patent is hereby corrected as shown below:

On the Title Page

Item (75) Inventors:
"Janet Rivett, Simpsonville, NC (US)" should read --Janet Rivett, Simpsonville, SC (US)--;
"Drew V. Speer, Simpsonville, NC (US)" should read --Drew V. Speer, Simpsonville, SC (US)--.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*